United States Patent
Honaga

[11] Patent Number: 5,796,179
[45] Date of Patent: Aug. 18, 1998

[54] VEHICLE ANTI-THEFT DEVICE WITH LOW VOLTAGE COMPENSATION AND A ROLLING CODE

[75] Inventor: Kazuhiro Honaga, Shizuoka-ken, Japan

[73] Assignee: Suzuki Motor Corporation, Shizuoka-ken, Japan

[21] Appl. No.: 717,261

[22] Filed: Sep. 20, 1996

[30] Foreign Application Priority Data

| Sep. 30, 1995 | [JP] | Japan | 7-277242 |
| Sep. 30, 1995 | [JP] | Japan | 7-277243 |
| Sep. 30, 1995 | [JP] | Japan | 7-277244 |
| Sep. 30, 1995 | [JP] | Japan | 7-277246 |
| Sep. 30, 1995 | [JP] | Japan | 7-277247 |

[51] Int. Cl.⁶ ............................ B60R 25/04
[52] U.S. Cl. .................. 307/10.5; 180/287
[58] Field of Search .................. 307/10.1–10.6; 180/287; 364/423.098, 424.034, 424.037; 340/429.9, 426, 825.3–825.32, 825.34, 825.69, 825.72, 825.54

[56] References Cited

U.S. PATENT DOCUMENTS

| 5,412,379 | 5/1995 | Waraksa et al. | 340/825.72 |
| 5,519,376 | 5/1996 | Iijima | 340/426 |
| 5,539,260 | 7/1996 | Khangura et al. | 307/10.3 |
| 5,583,383 | 12/1996 | Denz et al. | 307/10.2 |
| 5,600,324 | 2/1997 | Reed et al. | 340/825.69 |
| 5,621,381 | 4/1997 | Kawachi et al. | 340/426 |
| 5,631,501 | 5/1997 | Kubota et al. | 307/10.5 |
| 5,635,900 | 6/1997 | Hasegawa et al. | 340/426 |

FOREIGN PATENT DOCUMENTS

| 63-93649 | 4/1988 | Japan |
| 6-270764 | 9/1994 | Japan |
| 7-69173 | 3/1995 | Japan |

*Primary Examiner*—Richard T. Elms
*Attorney, Agent, or Firm*—Flynn, Thiel, Boutell & Tanis, P.C.

[57] ABSTRACT

A vehicle theft-prevention device which includes an ignition key having a transponder, a coil unit for supplying power to the transponder when the ignition key is inserted into the coil unit and then turned to a starting position thereby permitting the transponder to generate an identification code. The coil unit outputs the identification code to a disabling controller and the disabling controller outputs an engine drive signal when the identification code from the coil unit is valid and outputs an engine stop signal when the identification code is invalid. The vehicle theft prevention device also includes an engine controller for permitting an engine starting operation to continue when the engine drive signal is input into the engine controller from the disabling controller within a predetermined communication time period from a moment the engine starting operation is initiated by turning the ignition key to the start position. The disabling controller and the engine controller are each provided with respective low-voltage communication modules for communicating therebetween when a battery voltage is less than a predetermined low-voltage level after the engine starting operation is initiated.

13 Claims, 18 Drawing Sheets

VEHICLE ANTI-THEFT DEVICE WITH LOW VOLTAGE COMPENSATION AND A ROLLING CODE

FIELD OF THE INVENTION

The present invention relates generally to a theft prevention device for a vehicle, and more particularly to a theft prevention device which includes an ignition key having a predetermined identification code stored therein for use in starting the vehicle.

BACKGROUND OF THE INVENTION

In vehicles such as automobiles, theft-prevention devices incorporating various countermeasures therein have been developed in order to prevent the vehicles from being stolen by manipulating an ignition key cylinder either with or without the use of a valid ignition key.

Among such devices, there is one type of theft-prevention device which includes an ignition key having a code stored therein and a transponder for outputting the code in response to power being applied thereto. The known theft-prevention device also includes a disabling controller for immobilizing the vehicle when the code sent to the controller from the transponder is not valid; an engine controller for starting an engine when a valid code is sent to the engine controller from the disabling controller; and a fault-diagnosing apparatus linked to a communication line between the disabling controller and the engine controller.

One example of a vehicle theft-prevention device is disclosed in published Japanese Patent Application Laid-Out No. 63-93649. This publication discloses a vehicle key apparatus having an annular core disposed around a key insertion hole of a locking mechanism; a rotor coil wound around the annular core; a signal-generating means for supplying the rotor coil with a signal for use in detecting information embedded in a key inserted in the key insertion hole; a signal-detecting means for detecting the signal transmitted to the rotor coil from the key; and a control means for picking up an output signal from the signal-detecting means in order to compare information represented by the output signal with other information for use in determining whether an authorized attempt to start the vehicle is occurring. The control means outputs an engine drive signal to an engine controller when the contents of the above-compared information are consistent with each another.

Further, the key includes a shaft-shaped core which is positioned near the annular core at two locations when the key is inserted into the lock thereby forming a magnetic circuit; a key coil wound around the annular core wherein the key coil is magnetically coupled to the rotor coil when the key is inserted into the lock; and, an information-generating means for generating a signal containing particular information from the key coil in response to a signal induced by the key coil.

Another example of a vehicle theft-prevention device is disclosed in published Japanese Patent Application Laid-Out No. 6-270764. The theft-prevention device includes a key unit, a key-detecting circuit, and an engine control circuit. A plurality of communication lines are provided between the key-detecting circuit and engine control circuit. The key-detecting circuit sends out an engine drive signal to all of the communication lines when a key code and a predetermined code from the key unit are coincident with one another. The engine control circuit starts the engine when the engine drive signal is present on one of the communication lines. In addition, the engine control circuit determines whether or not the communication lines have been disconnected. When the plurality of communication lines are disconnected, the engine control circuit measures the length of time that the communication lines are disconnected in order to determine whether or not the disconnection is caused by theft. As a result, the cause of the disconnection of the communication lines is detected.

Yet another example of a vehicle theft-prevention device is disclosed in published Japanese Patent Application Laid-Out No. 7-69173. In the theft-prevention device, when a key is inserted into a key cylinder, an identification code stored in a memory associated with the key is read out and compared with an identification code stored in a memory associated with a vehicle, in order to determine whether the two identification codes coincide with one another. If the identification codes coincide, the engine is permitted to start. When the key is turned to a start position, an engine drive signal is output for a certain period of time. As a result, the consumption of a vehicle battery is reduced.

In the type of vehicle theft-prevention devices which incorporate a disabling controller and an engine controller, either the disabling controller or the engine controller must act as a master when the disabling controller and engine controller communicate with each other. As illustrated in FIG. 5, when the disabling controller acts as a master, the disabling controller transmits code validation results to the engine controller when an ignition key turns an ignition switch to a start or ON position. When the engine controller acts as the master, the engine controller polls the disabling controller for the code validation results, and the disabling controller then responds to the query.

However, in a case where a weak or otherwise substantially discharged vehicle battery experiences a drop in terminal voltage as an engine is cranked over during starting, the drop in battery voltage may approach a reset voltage for the controllers. If the battery voltage drops down to or below the reset voltage, a difference in reset voltage between the disabling controller and the engine controller causes one of the two controllers to be reset. As a result, in some cases, communication between the disabling controller and the engine controller is interrupted.

As illustrated in FIG. 6, an inconvenience arises when the disabling controller, acting as the master, is reset. More specifically, when the battery recovers to the point that the terminal voltage thereof increases above the reset voltage, and the disabling controller re-establishes communication with the engine controller, a predetermined time period (T) for communicating with the engine controller may have elapsed, thus preventing the engine from starting past the time (B) when the time period (T) has elapsed. Furthermore, when the engine controller acts as the master, the disabling controller may be reset by the drop in battery voltage thus preventing communication with the engine controller within the predetermined time period.

In order to avoid the situation where the disabling controller and the engine controller can not communicate within the predetermined time period due to a drop in battery voltage during starting of the vehicle, it has been suggested to initiate communication between the disabling controller and the engine controller after the engine has been started. However, permitting the engine to start prior to determining whether engine start was authorized, creates problems as far as security for theft prevention is concerned.

In some prior art vehicle theft-prevention devices, a rolling authorization code is transmitted between the disabling controller and an engine controller. In rolling authorization code systems, the rolling authorization code changes each time the vehicle is started, for security purposes. Typically, a present authorization code and a next authorization code are stored in storage devices such as EEPROMs of the disabling controller and the engine controller.

If, during engine startup, the battery voltage drops below a reset voltage of the controllers while the next authorization codes are being written to the storage devices, the next authorization codes could be inaccurately written thereto. As a result of failing to correctly write the next codes to each of the storage devices, a mismatch between the next codes may occur the next time that communication is established between the disabling controller and the engine controller (e.g. during the next engine start-up), thus preventing the engine from starting, which is disadvantageous in view of practical use.

In addition, as shown in FIG. 13, in some prior art vehicle theft-prevention devices which use rolling authorization codes, the authorization codes (e.g. code 1, code 2, etc.) corresponding to the order of addresses (e.g. 0000, 0001, etc.) are written to and stored in respective storage devices 116, 118 of the disabling controller and engine controller, respectively. This causes an inconvenience in that there is limited storage capacity in each of the storage devices 116, 118, and thus the number of different rolling authorization codes is limited to the amount of storage space available, which is disadvantageous in view of practical use. Another inconvenience is that if storage devices having greater storage capacity are used, higher costs are incurred which is disadvantageous from an economic viewpoint.

Furthermore, as illustrated in FIG. 14, in some prior art vehicle theft-prevention devices which use rolling authorization codes, the storage devices 216, 218 of the disabling controller and engine controller are formed with respective addresses for storing the present authorization codes and the next authorization codes. A randomizing mechanism associated with the disabling controller randomly varies the next authorization code prior to transmitting the code to the engine controller. Thus, the storage devices 216, 218 store the present and next authorization codes at successive storage locations therein. It should be appreciated that the number of storage locations utilized in each of the storage devices is an indication of the number of times that the ignition key was used to start the vehicle over the life of the vehicle.

As a result, the number of times that the present and next authorization codes can be written into the storage locations is limited to a range of approximately ten thousand to fifty thousand times. Generally, authorization codes should be able to be written to the storage devices 216, 218 at least a hundred thousand times. This causes an inconvenience in that the number of write accesses permissible over the life of the vehicle is deficient relative to the service life of the vehicle. Accordingly, there has been a great demand for a vehicle theft-prevention device which is capable of extending the number of times that randomized authorization codes can be written to the storage devices associated with the disabling and engine controllers.

In some types of vehicle theft-prevention devices which incorporate a disabling controller and an engine controller, a particular baud rate or modulating speed must be selected in order for the disabling controller to communicate with the engine controller. For this reason, the disabling controller is adapted to provide for different baud rates of the engine controller. In other words, there are cases where, even in the same type of vehicles, the type of engine controller varies according to different engine specifications (such as exhaust quantity, the presence of a supercharger, etc.). In many cases, a central processing unit (CPU) within the engine controller differs with each different manufacturer of the engine controller. As a result, the disabling controller must work with various engine controllers having different communication speeds.

In vehicle theft-preventing devices according to the prior art, there are inconveniences in that different versions of disabling controllers must be used for different communication speeds of engine controllers. Further, there must be a different version of the disabling controller for each different baud rate associated with the engine controller, thus increasing the number of different versions of disabling controller available.

In some types of vehicle theft-prevention devices which incorporate a disabling controller and an engine controller, the loss of an ignition key requires the use of a master key which is inserted into a key cylinder so as to reset the disabling controller and engine controller. In particular, the master key initializes the disabling controller and engine controller because data stored therein is based on the previously used ignition key. The previous data is erased when the disabling controller and engine controller are re-registered based on a new ignition key.

However, the master key is typically retained by the owner of the vehicle, and must be kept in a secure location in order to preclude a third party from re-registering the disabling controller and engine controller with a new ignition key. In addition, there is a consequential cost increase associated with providing a vehicle theft-preventing device with a master key along with the ignition keys. Other inconveniences are that a user must maintain custody of the master key thereby imposing a burden on the user for such safekeeping. Further, the loss of the master key makes it impossible to use the same disabling controller and engine controller, thereby imposing an increased burden on the user in view of cost. Furthermore, there is another inconvenience in that the device according to the prior art must have further components added therein such as an electric circuit etc. with the result that an increased number of components and thus a complicated structure are involved.

SUMMARY OF THE INVENTION

In order to obviate the above-mentioned inconveniences, the present invention provides a vehicle theft-prevention device including an ignition key having a transponder, a coil unit for supplying power to the transponder when the ignition key is inserted into the coil unit and then turned to a starting position thereby permitting the transponder to generate an identification code, the coil unit outputting the identification code to a disabling controller wherein the disabling controller outputs an engine drive signal when the identification code from the coil unit is valid and outputs an engine stop signal when the identification code is invalid, and an engine controller for permitting an engine starting operation to continue when the engine drive signal is input into the engine controller from the disabling controller within a predetermined communication time period from a moment the engine starting operation is initiated by turning the ignition key to the start position, wherein the disabling controller and the engine controller are provided with respective low-voltage communication circuits for communicating therebetween when a battery voltage is less than a predetermined low-voltage level after the engine starting operation is initiated.

Thus, a vehicle theft-preventing device according to the present invention includes an ignition key, a coil unit, a disabling controller, and an engine controller, wherein the disabling controller and the engine controller are provided with respective low-voltage communication mode circuits for executing respective low-voltage communication modes so as to ensure communication between the disabling controller and the engine controller when a battery voltage drops below a predetermined low-voltage level after engine start-up is initiated by rotating the ignition key.

The low-voltage communication circuit of the disabling controller restarts communication with the engine controller when the battery voltage is equal to or greater than a predetermined resumption voltage level after a period of time between the moment engine start-up is initiated by rotating the ignition key and the moment the battery voltage drops below the predetermined low-voltage level. The low-voltage communication circuit of the engine controller extends a time to terminate a predetermined communication time period when the battery voltage is greater than or equal to the predetermined resumption voltage level after a period of time between the moment engine start-up is initiated and the moment the battery voltage drops below the predetermined low-voltage level.

As a result, when the battery voltage drops, the vehicle theft-preventing device can ensure communication between the disabling controller and the engine controller. Furthermore, the device can determine through the disabling controller whether or not engine start-up is authorized during engine cranking.

The present invention also provides a vehicle theft-prevention device including a transponder associated with an ignition key which outputs a predetermined identification code in response to power supplied to the transponder when the ignition key is positioned within a key cylinder and turned to a starting position, a disabling controller which outputs a predetermined rolling authorization code in response to a valid identification code received from the transponder, and an engine controller which permits an engine starting operation to continue when the rolling authorization code received from the disabling controller is valid and which prevents an engine from starting when the rolling authorization code is invalid or when no rolling authorization code is received from the disabling controller within a predetermined period of time, wherein the improvement includes a mechanism for storing a present rolling authorization code from the disabling controller as a previous rolling authorization code from the disabling controller and for storing a present rolling authorization code from the engine controller as a previous rolling authorization code from the engine controller when the present rolling authorization code from the disabling controller matches the present rolling authorization code from the engine controller, and a mechanism associated with the disabling controller for determining whether or not the previous rolling authorization code from the disabling controller and the previous rolling authorization code from the engine controller match when the present rolling authorization code from the disabling controller does not match the present rolling authorization code from the engine controller.

According to the structure as described above, when there occurs a mismatch in the rolling codes between the disabling controller and the engine controller, the disabling controller determines whether or not the previous rolling authorization codes match. This function permits the synchronization of the rolling codes to be recovered when the rolling codes are out-of-synchronization due to an interruption during a communication session between the disabling controller and the engine controller.

The present invention also provides a vehicle theft-prevention device including a transponder associated with an ignition key which outputs a predetermined identification code in response to power supplied to the transponder when the ignition key is positioned within a key cylinder and turned to a starting position, a disabling controller which outputs a predetermined rolling authorization code in response to a valid identification code received from the transponder, and an engine controller which permits an engine starting operation to continue when the rolling authorization code received from the disabling controller is valid and which prevents an engine from starting when the rolling authorization code is invalid or when no rolling authorization code is received from the disabling controller within a predetermined period of time, wherein the improvement includes a first storage device associated with the disabling controller for storing a first rolling authorization code, a second storage device associated with the engine controller for storing a second rolling authorization code, and a mechanism associated with the engine controller for generating a first shifted address within the first storage device and a second shifted address within the second storage device so as to store the first and said second rolling authorization codes at the first and said second shifted addresses, respectively.

According to the structure as previously mentioned, whenever the rolling codes are stored in the first and second storage devices, the engine controller shifts an address at which the rolling codes are stored. As a result, the number of times that the rolling authorization code can be written to the storage devices is increased.

The present invention further provides a vehicle theft-preventing device including an engine key having an identification code retained therein and having a transponder for outputting the identification code in response to power being applied to the transponder, a disabling controller for outputting the identification code received from the transponder when the identification code is valid, an engine controller for starting an engine when the identification code is received from the disabling controller, and a fault-diagnosing apparatus coupled to a communication line between the disabling controller and the engine controller, wherein the improvement includes a storage mechanism associated with the disabling controller for storing an ID code associated with the engine controller, the fault-diagnosing apparatus receiving the ID code from the engine controller and sending the ID code to the storage mechanism when the vehicle theft-prevention device is assembled into a vehicle.

According to the structure of the present invention, when the theft-preventing device is built into a vehicle, the fault-diagnosing apparatus is coupled to the communication line between the disabling controller and the engine controller in order that the ID code of the engine controller is stored by the disabling controller. The disabling controller identifies the engine controller by the stored ID code, whereby a baud rate is determined. As a result, settings of the disabling controller need not be divided according to the baud rates. In addition, the use of the communication line eliminates the need for components such as a changeover switch, which thus leads to a simpler construction at low cost.

The present invention further provides a vehicle theft-preventing device including an engine key having an identification code retained therein and having a transponder for outputting the identification code in response to power being applied to the transponder, a disabling controller for outputting the identification code received from the transponder when the identification code is valid, an engine controller for starting an engine when the identification code is received from the disabling controller, and a fault-diagnosing apparatus coupled to a communication line between the disabling controller and the engine controller, wherein the improvement includes a mechanism for storing a predetermined personal identification code in the disabling controller, and a cartridge associated with the fault-diagnosing apparatus which permits the personal identification code to be entered through the fault-diagnosing apparatus.

According to the structure of the present invention, only entry of the personal identification code into the fault-diagnosing apparatus is required for registration. As a result, there is no need for a master key, and the burden imposed on the user is alleviated, with a consequential reduction in cost.

Other objects and purposes of the present invention will be apparent to persons familiar with structures of this general type upon reading the following specification and inspecting the accompanying drawings.

DETAILED DESCRIPTION

Figure 2:
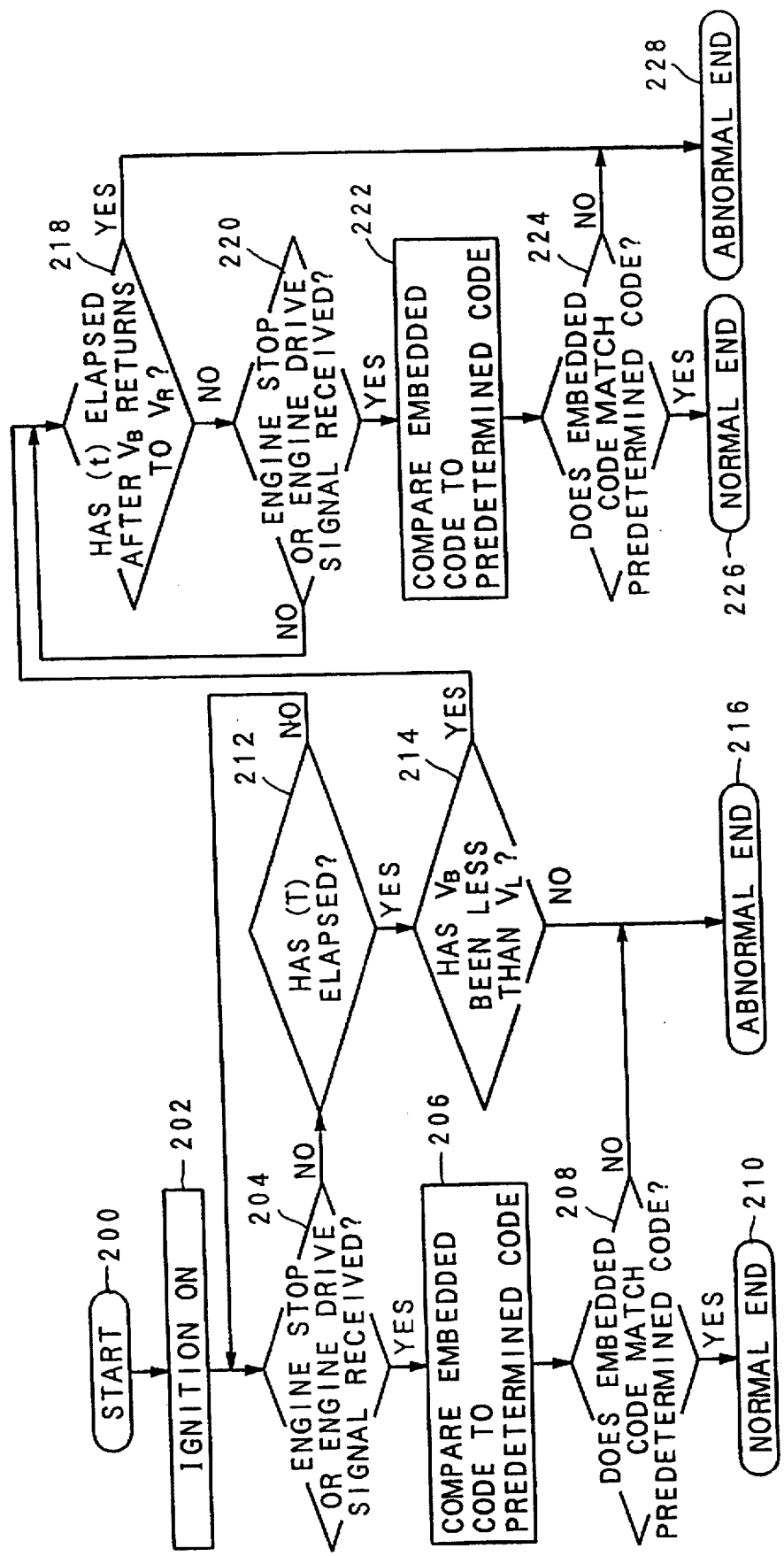
FIG. 2 is a flow chart showing a control routine for an engine controller of a vehicle theft-prevention device according to the first embodiment of the present invention.
Figure 3:
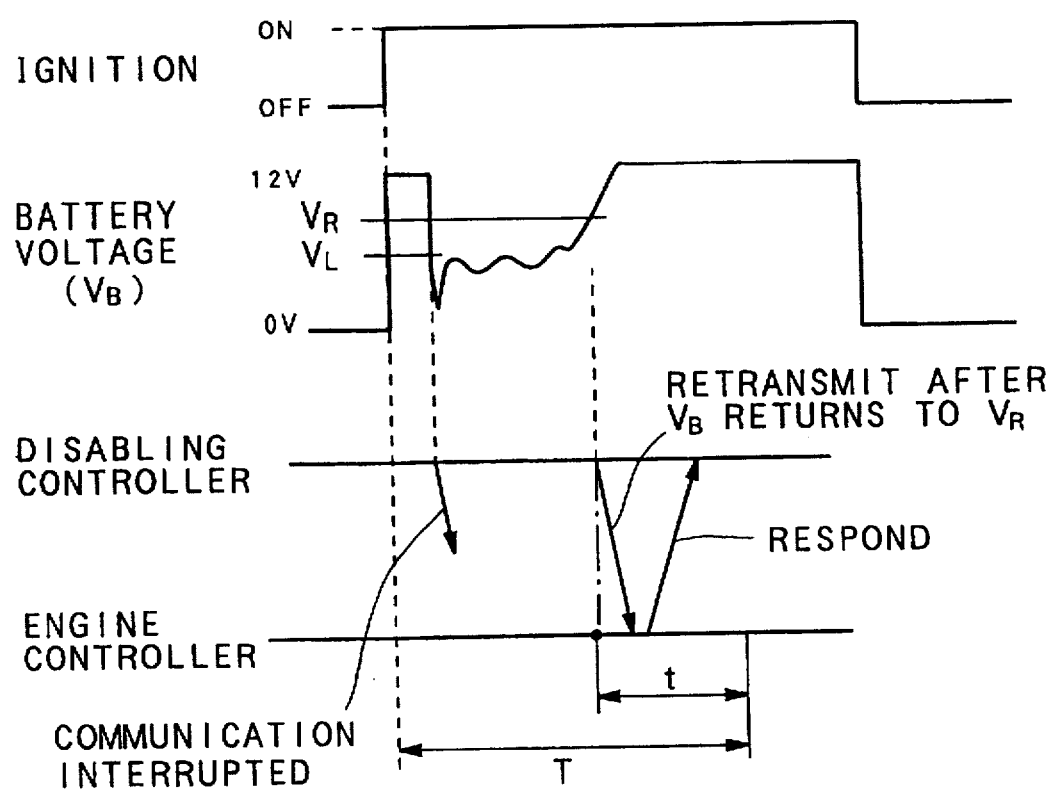
FIG. 3 is a timing diagram showing disabling controller and engine controller responses to a drop in a battery voltage.
Figure 4:
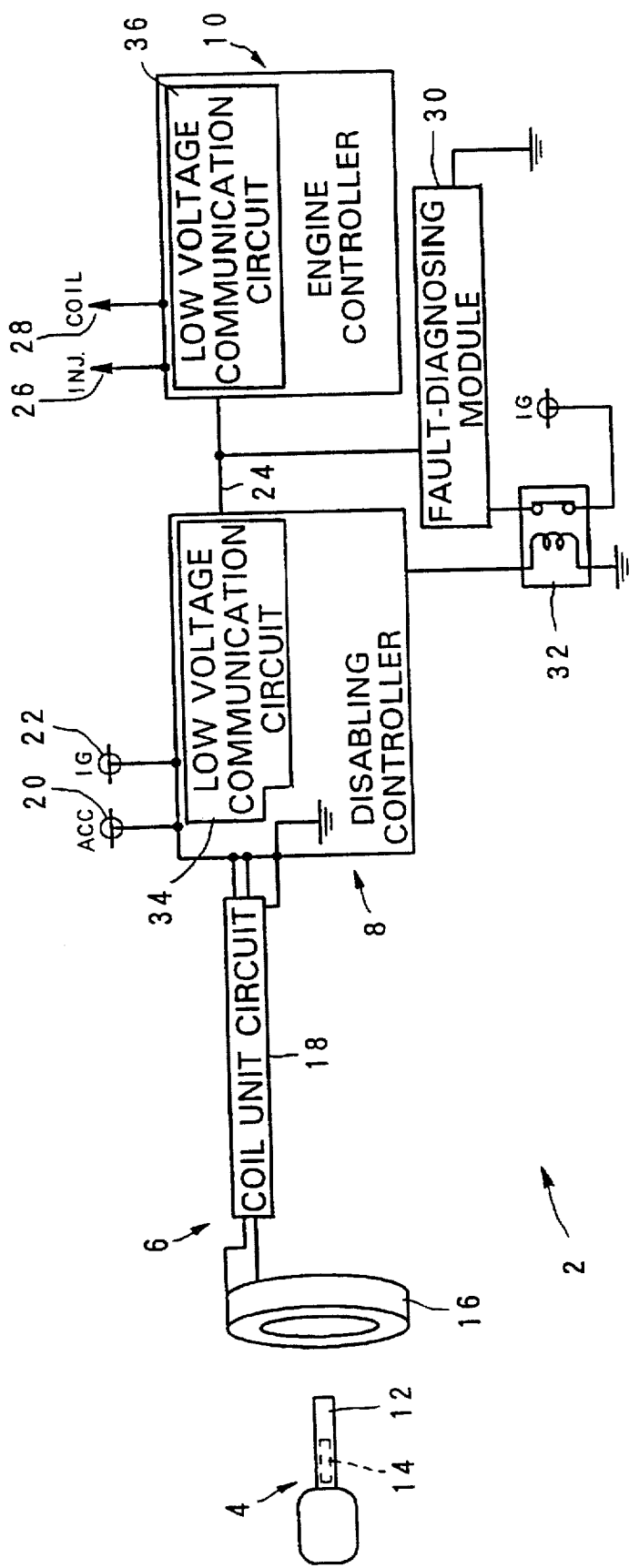
FIG. 4 is an circuit diagram of the vehicle theft-prevention device according to the first embodiment of the present invention.
Figure 5:
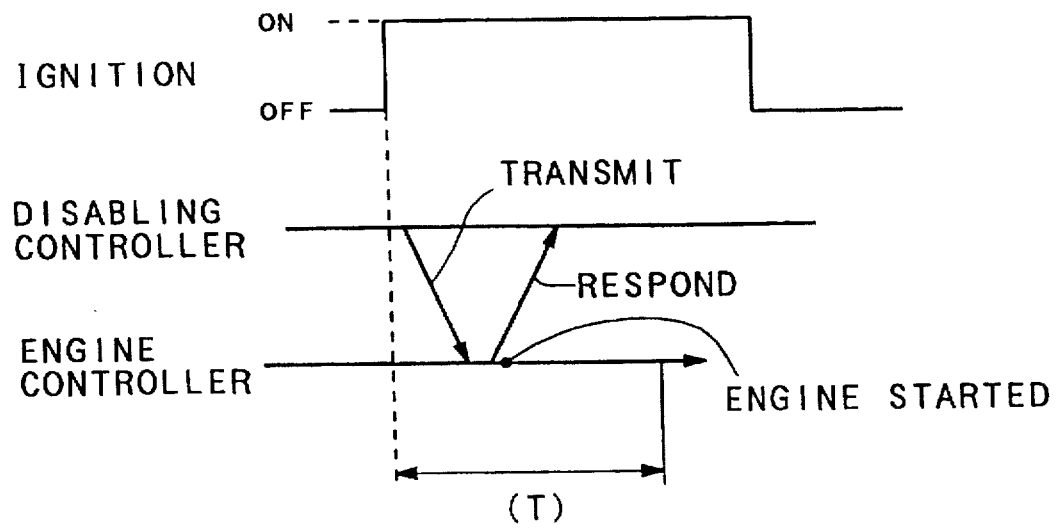
FIG. 5 is a timing diagram showing disabling controller and engine controller responses to a normal battery voltage in a vehicle theft-prevention device according to the prior art.
Figure 6:
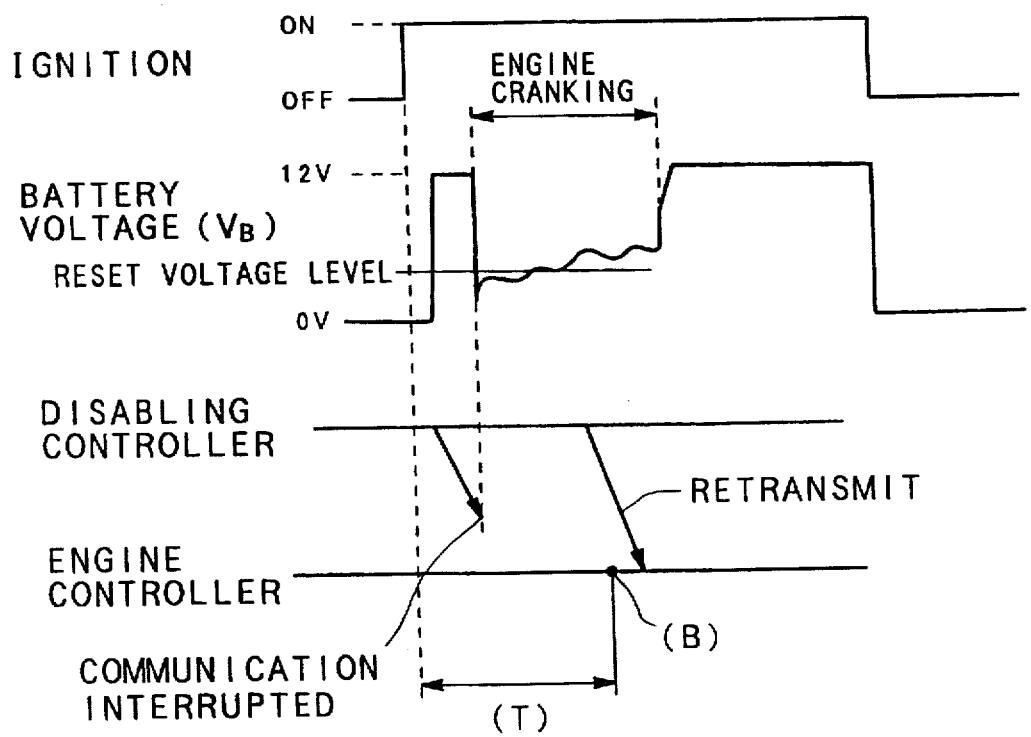
FIG. 6 is a timing diagram showing disabling controller and engine controller responses to a drop in the battery voltage in the vehicle theft-prevention device according to the prior art.

FIGS. 1–4 illustrate a vehicle theft-prevention device according to a first aspect of the present invention. In FIG. 4, reference numeral 2 denotes a vehicle theft-prevention device. The device 2 includes an ignition key 4, a coil unit 6, a disabling controller 8, and an engine controller 10.

The ignition key 4 is defined with a key groove 12, and is further provided with a transponder 14. The transponder 14 includes a coil portion and a code generation portion (not shown), and is driven by the supply of power thereto from the coil unit 6 to generate an identification code. Turning the ignition key 4 to a start position causes an ignition circuit (IG) 22 to be switched on, while permitting a starter switch (not shown) to be switched on so as to supply power to a starter motor (not shown).

The coil unit 6 is provided with a coil portion 16 in which the ignition key 4 is inserted and rotated, and a circuit 18 connected to the coil portion 16. The ignition key 4 is inserted in the coil portion 16 and turned to the start position, thereby switching on the ignition circuit 22. As a result, the coil portion 16 is excited by power supplied from the circuit 18. The coil portion of the transponder 14 is electromagnetically coupled to the coil portion 16 so as to be supplied with power. When powered, the coil portion of the transponder 14 permits the code generation portion of the transponder 14 to generate the identification code which is then received by the coil portion 16.

The circuit 18 is connected to the disabling controller 8 so that the identification code received by the coil portion 16 is output to the disabling controller 8. The disabling controller 8 determines whether or not the identification code fed from the coil unit 6 is valid. The disabling controller 8 is connected to an accessory circuit (ACC) 20 and the ignition circuit (IG) 22 of an engine (not shown). Further, the disabling controller 8 is connected to the engine controller 10 via a dedicated communication line 24.

The disabling controller 8 outputs an engine drive signal to the engine controller 10 when the identification code is valid. In a converse case, the disabling controller 8 outputs an engine stop signal to the engine controller 10 when the identification code is not valid. The engine controller 10 permits and prevents engine start-up in response to the engine start and engine stop signals, respectively, which are fed from the disabling controller 8. The engine controller 10 is connected to a fuel injection valve (INJ) 26 and an ignition coil (COIL) 28 of the engine. When the ignition circuit 22 is switched on, the starter motor is powered, while at the same time, fuel injection and ignition are provided in a usual manner.

The engine controller 10 permits fuel to be injected by the fuel injection valve 26 and ignition to be supplied by the ignition coil 28 so as to provide continued engine operation when the engine drive signal is fed to the engine controller 10 from the disabling controller 8 within a predetermined communication time period (T) beginning the moment engine start-up is initiated by the ignition key 4 being positioned into the start position.

Further, the engine controller 10 cuts the fuel supply effected by the fuel injection valve 26 or the ignition effected by the ignition coil 28 so as to prohibit engine operation when the engine stop signal is input into the engine controller 10 from the disabling controller 8, including the case where neither the engine drive signal nor the engine stop signal is received by the engine controller 10 within the predetermined communication time period (T) beginning the moment engine start-up is initiated by the ignition key 4 being positioned into the start position. Reference numerals 30 and 32 denote a fault-diagnosing module and a relay, respectively. The relay supplies and interrupts power supplied to the fault-diagnosing module 30.

The disabling controller 8 and the engine controller 10 are provided with low-voltage communication circuits or modules 34 and 36, respectively. The low-voltage communication circuits 34 and 36 function to monitor a voltage ($V_B$) which is supplied from a battery (not shown). In addition, the low-voltage communication circuit 34 and 36 permit the disabling controller 8 and the engine controller 10 to communicate when battery voltage ($V_B$) drops below a predetermined low-voltage level ($V_L$) after engine start-up is initiated by turning the ignition key 4 to the start position.

The low-voltage communication circuit 34 of the disabling controller 8 restarts communication with the engine controller 10 once the battery voltage ($V_B$) recovers to a voltage level greater than or equal to a predetermined resumption voltage level ($V_R$) after a period of time between the moment engine start-up is initiated by the ignition key 4 being positioned to the start position and the moment battery voltage ($V_B$) drops below the predetermined low-voltage level ($V_L$).

The low-voltage communication circuit 36 of the engine controller 10 extends the communication time period (T) by a predetermined time extension period (t) once the battery voltage ($V_B$) recovers to a voltage level greater than or equal to the resumption voltage level ($V_R$) after the period of time between the moment engine start-up is initiated by the ignition key 4 being positioned to the start position and the moment battery voltage ($V_B$) drops below the predetermined low-voltage level ($V_L$).

The operation of the vehicle theft-prevention device according to a first embodiment of the present invention will be described with reference to the flow charts shown in the FIGS. 1 and 2, and the timing diagram shown in FIG. 3. Initially, the ignition key 4 is inserted into the coil unit 6, and is then turned to a start position wherein the ignition circuit 22 is switched on. At the same time, a starter motor is powered, while both fuel injection and ignition are executed. Then, the disabling controller 8 and engine controller 10 start to provide respective control.

Figure 1:
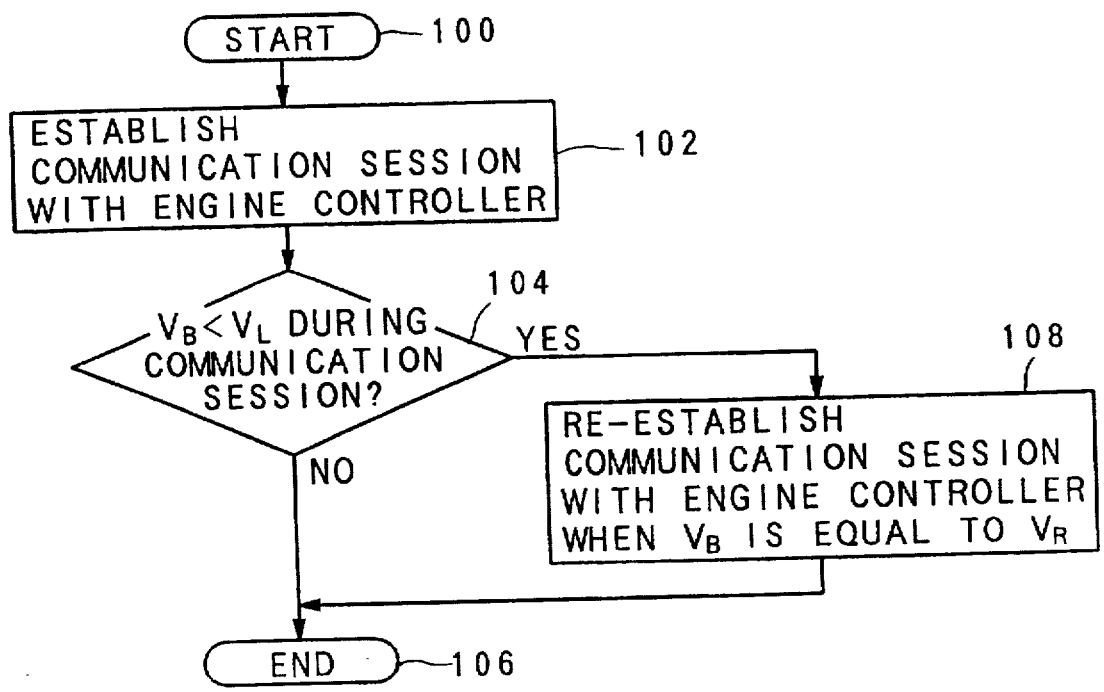
FIG. 1 is a flow chart showing a control routine for a disabling controller of a vehicle theft-prevention device according to a first embodiment of the present invention.

As illustrated in FIG. 1, when control in the disabling controller 8 starts at step 100, the coil unit 6 supplies power to the transponder 14 of the ignition key 4, and the resulting identification code is fed or otherwise electromagnetically coupled to the disabling controller 8 through the coil unit 6. The disabling controller 8 determines whether or not the identification code entered therein from the coil unit 6 is valid, and then communicates the results of the determination to the engine controller 10 through the communication line 24 in step 102.

When the identification code is valid, the disabling controller 8 outputs an engine drive signal to the engine controller 10 through the communication line 24. When the identification code is invalid, the disabling controller 8 outputs an engine stop signal to the engine controller 10 through the communication line 24. The engine controller 10 causes the engine to continue operating when the engine drive signal is fed into the engine controller 10 from the disabling controller 8 within the predetermined communication time period (T) from the moment engine start-up is initiated by the ignition key 4 being turned to the start position. The engine controller 10 prohibits the engine from operating when the engine stop signal, or neither the engine drive signal nor the engine stop signal is fed into the engine controller 10 from the disabling controller 8 within the communication time period (T) from the moment engine start-up is initiated by the ignition key 4 being turned to the start position.

Concurrently therewith, the disabling controller 8 monitors battery voltage ($V_B$) by means of the low-voltage communication circuit 34, and then determines at step 104 whether or not the battery voltage ($V_B$) has dropped below the predetermined low-voltage level ($V_L$) during the period of time between the moment engine start-up is initiated by turning the ignition key 4 to the start position and the moment communication with engine controller 10 ends. When battery voltage ($V_B$) has not dropped below the low-voltage level ($V_L$) before communication with the engine controller 10 ends, and thus the result of step 104 is NO, then the routine ends at step 106.

When battery voltage ($V_B$) has dropped below low-voltage level ($V_L$) before communication with the engine controller 10 has ended, and thus the result of step 104 is YES, then the communication therewith is interrupted, as illustrated in FIG. 3. The disabling controller 8 restarts the communication with the engine controller 10 at step 108 once the battery voltage ($V_B$) recovers to a voltage level greater than or equal to the predetermined resumption voltage level ($V_R$) after a period of time between the moment engine start-up is initiated by the ignition key 4 being positioned to the start position and the moment battery voltage ($V_B$) drops below the predetermined low-voltage level ($V_L$). The routine then ends at step 106.

The low-voltage communication circuit 34 of the disabling controller 8 restarts communications with the engine controller 10 by outputting either the engine drive signal or the engine stop signal once the battery voltage ($V_B$) recovers to a voltage level greater than or equal to the resumption voltage level ($V_R$) after a period of time between the moment engine start-up is initiated by the ignition key 4 being positioned to the start position and the moment battery voltage ($V_B$) drops below the low-voltage level ($V_L$).

As shown in FIG. 2, control in the engine controller 10 starts at step 200, and the ignition circuit 22 is switched on at step 202. As a result, the starter motor is powered, while both fuel injection and ignition are executed. A determination is made at step 204 as to whether or not an engine drive or engine stop signal has been communicated to the engine controller 10 from the disabling controller 8 through the communication line 24.

When the result of step 204 is YES, an authorization code embedded in the communicated engine drive or engine stop signal is checked against a predetermined authorization code for the engine drive or engine stop signal stored in the engine controller 10 at step 206 in order to determine at step 208 whether or not the embedded authorization code matches the predetermined authorization code. When the result of step 208 is YES, the routine ends normally at step 210.

When the result of step 204 is NO, a determination is made at step 212 as to whether or not the predetermined communication time period (T) has elapsed. When the communication time period (T) has not elapsed, and thus the result of step 212 is NO, then the routine returns to step 204. When the communication time period (T) has elapsed, and thus the result of step 212 is YES, then a determination is made at step 214 as to whether or not battery voltage ($V_B$) has been less than predetermined low-voltage level ($V_L$) during the time period (T), i.e. between the moment engine start-up is initiated by turning the ignition key 4 and the moment communication with the disabling controller 8 ends.

When battery voltage ($V_B$) has not dropped below the low-voltage level ($V_L$) before the end of time period (T), and thus the result of step 214 is NO, then the routine ends abnormally at step 216. In addition, when the result of step 208 is NO, the routine ends abnormally at step 216.

When battery voltage ($V_B$) has dropped below low-voltage level ($V_L$) before the end of the time period (T), and thus the result of step 214 is YES, the communication between the disabling controller 8 and the engine controller 10 is interrupted as shown in FIG. 3. Accordingly, a determination is made at step 218 as to whether or not the predetermined time extension period (t), which extends the communication time period (T), has elapsed from the moment battery voltage ($V_B$) is greater than or equal to the resumption voltage level ($V_R$) after battery voltage ($V_B$) has dropped below the low-voltage level ($V_L$).

When the time extension period (t) has not elapsed, and thus the result of step 218 is NO, a determination is made at step 220 as to whether or not the engine drive or engine stop signal has been communicated to the engine controller 10 from the disabling controller 8 through the communication line 24.

When the result of step 220 is NO, the routine returns to step 218. When the result of step 220 is YES, the embedded authorization code in the communicated engine drive or engine stop signal is checked against the predetermined authorization code for the engine drive or engine stop signal in the engine controller 10 at step 222 in order to determine at step 224 whether or not the embedded code matches the predetermined code. When the result of step 224 is YES, the routine ends normally at step 226. When the time extension period (t) has elapsed, and thus the result of step 218 is YES, the routine ends abnormally at step 228. Further, if the result of step 224 is NO, the routine also ends abnormally at step 228.

Thus, the predetermined communication time period (T) may be extended by the predetermined extension time period (t) from the moment battery voltage ($V_B$) is greater than or equal to the predetermined resumption voltage level ($V_R$). Alternatively, the predetermined communication time period (T) may be extended by a predetermined time extension period from the moment the starter motor stops or the starter switch is turned off.

Thus, the low-voltage communication circuit 36 of the engine controller 10 extends a time to terminate the communication time period (T) by the time extension period (t) when battery voltage ($V_B$) is greater than or equal to the resumption voltage level ($V_R$) after a period of time between the moment engine start-up is initiated by ignition key 4 and the moment battery voltage ($V_B$) is less than low-voltage level ($V_L$)

In sum, in the vehicle theft-prevention device 2, the low-voltage communication circuits 34 and 36 execute respective low-voltage communication modes in order to ensure communication between the disabling controller 8 and the engine controller 10 when battery voltage ($V_B$) drops below the low-voltage level ($V_L$) after engine start-up is initiated. The low-voltage communication circuit 34 retransmits a signal again once communication has been re-established, while the low-voltage communication circuit 36 extends the time period for communicating (T) by the time extension period (t). As a result, the vehicle theft-prevention device 2 can ensure communication between the disabling controller 8 and the engine controller 10 when battery voltage ($V_B$) drops. In addition, the vehicle theft-prevention device 2 can determine through the disabling controller 8 whether or not engine start-up is authorized during engine cranking.

Since the communication between the disabling controller 8 and the engine controller 10 can be securely provided when a battery output voltage drops due to low temperature or malfunction, the vehicle theft-prevention device 2 can prevent a communication failure which would otherwise occur as a result of an interruption in communication. The device 2 can then prevent the engine from not starting. Furthermore, since the device 2 can determine whether or not engine start-up is authorized during engine cranking, the device 2 can determine an identification code before the engine starts. As a result, security is improved in order to prevent theft.

Figure 7:
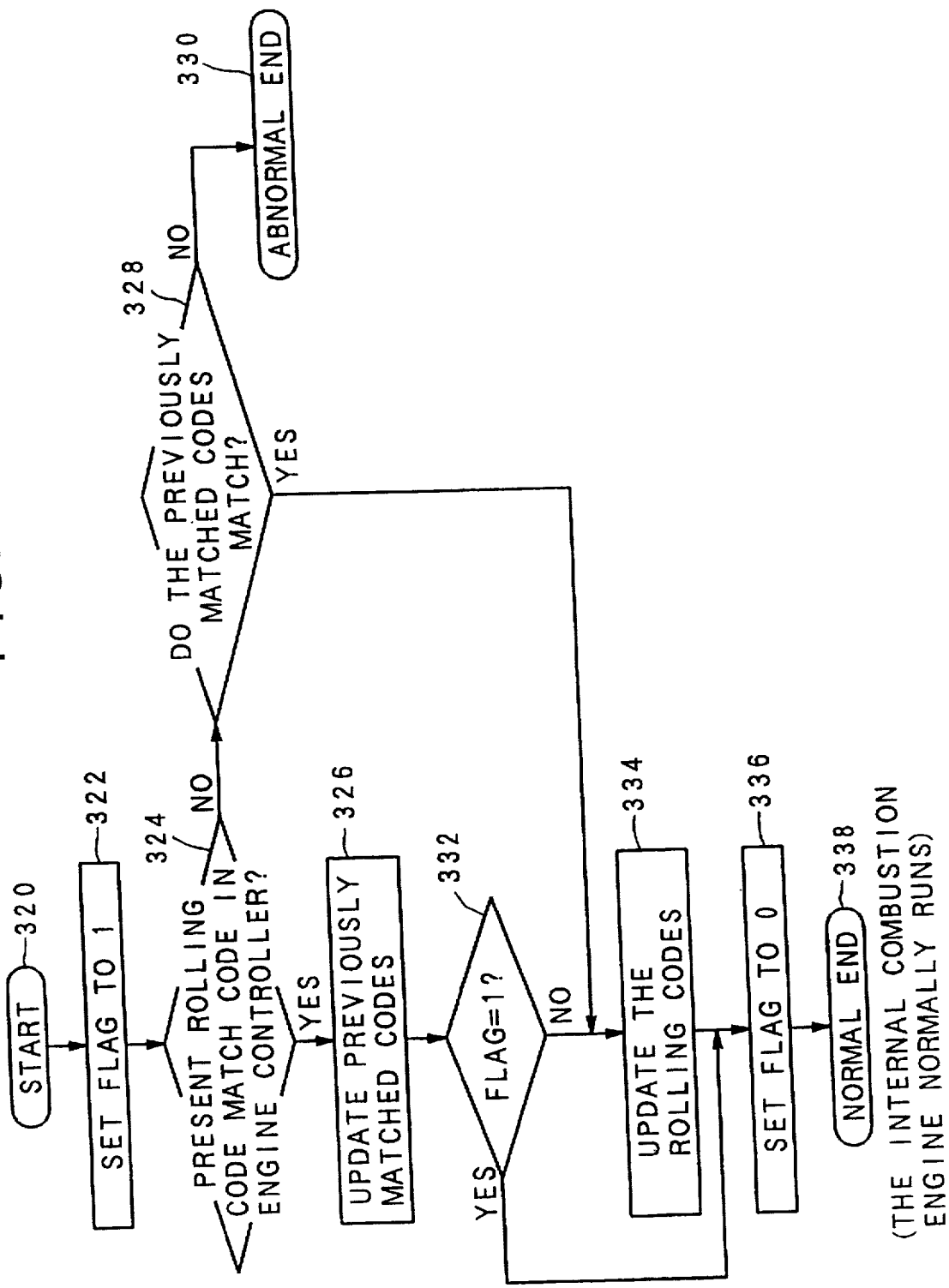
FIG. 7 is a flow chart showing a control routine for a vehicle theft-prevention device according to a second embodiment of the present invention.
Figure 8:
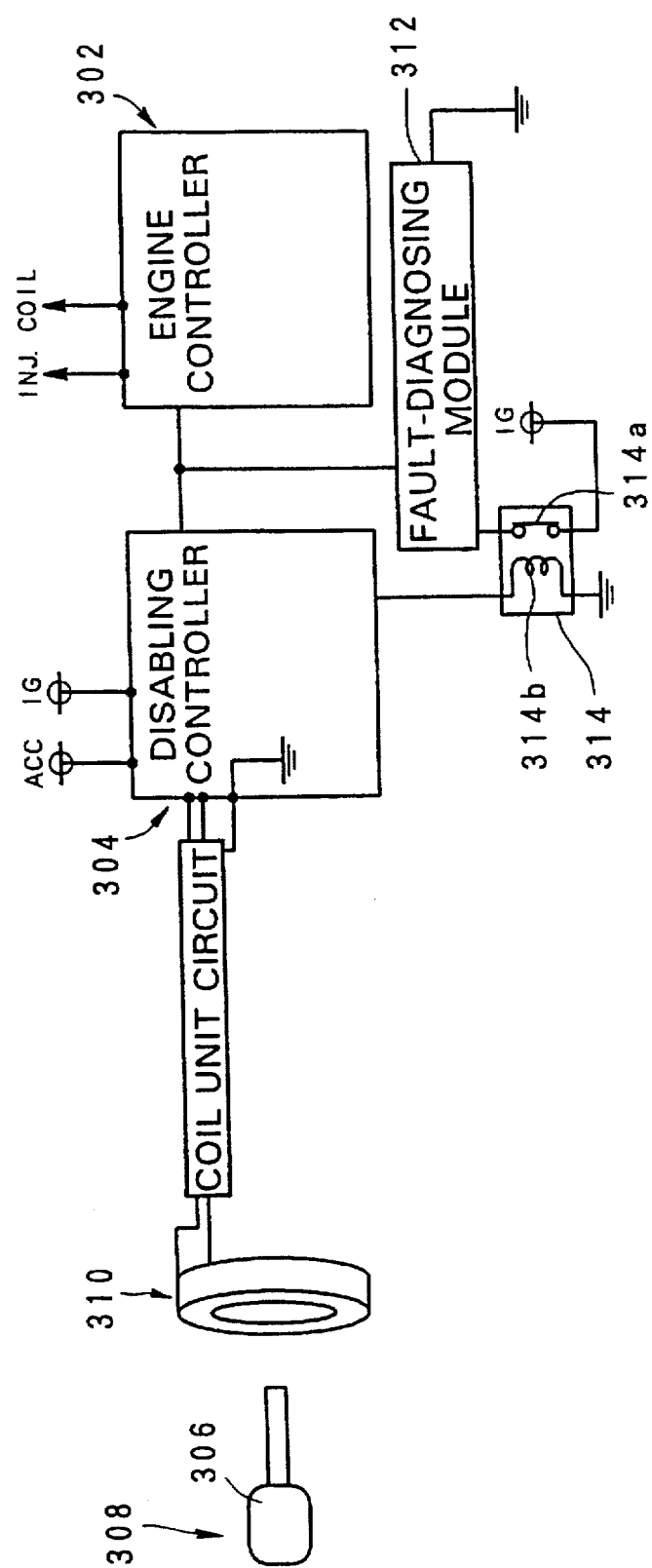
FIG. 8 is a circuit diagram of the vehicle theft-prevention device according to the second embodiment of the present invention.
Figure 9:
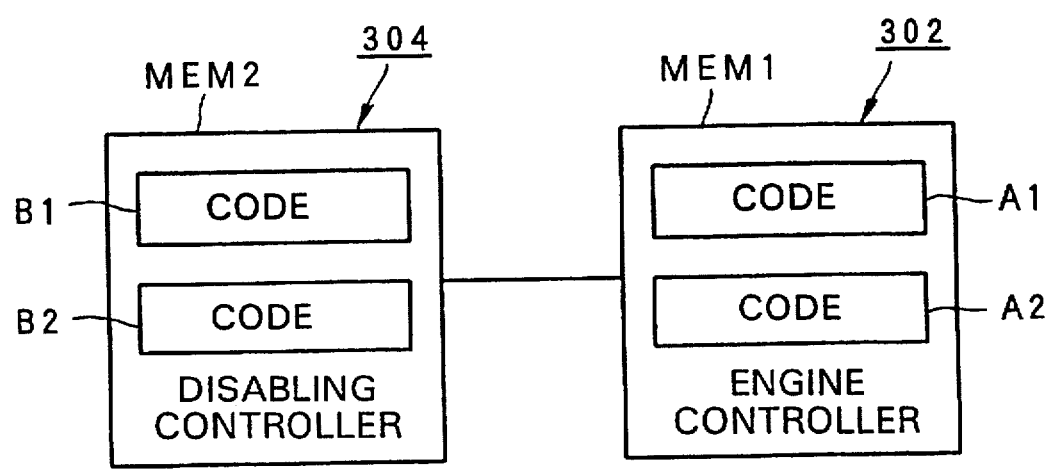
FIG. 9 is a block diagram showing respective storage devices of a disabling controller and an engine controller shown in FIG. 8.

FIGS. 7–9 illustrate a vehicle theft-prevention device according to a second aspect of the present invention. In FIG. 8, reference numeral 302 denotes an engine controller of an internal combustion engine (not shown) that is disposed in a vehicle (not shown). Reference numeral 304 denotes a disabling controller connected to the engine controller 302.

A predetermined rolling authorization code from the disabling controller 304 is entered into the engine controller 302. The engine controller 302 executes control such that the engine continues to be started when the predetermined rolling authorization code is correct, and further that the engine is stopped when the predetermined rolling authorization code is incorrect or when no rolling authorization code is transmitted within a predetermined period of time.

In other words, the engine controller 302 continues starting the engine only when receiving the correct rolling authorization code from the disabling controller 304. Thus, ignition and fuel injection action will continue. Conversely, when the predetermined rolling authorization code is incorrect, or when no rolling authorization code is transmitted within a predetermined period of time, ignition and fuel supply are cut-off. A signal lamp (not shown) may be turned on to signal the presence of an abnormality. The engine controller 302 is connected to an injector (not shown) and a coil (not shown).

In addition, the vehicle theft-prevention device includes a transponder 308 within an ignition key 306 for outputting a predetermined electrical identification code in response to electric power being supplied to the transponder 308 when an ignition switch (not shown) is activated, and a coil unit 310 in which the key 306 is inserted. The coil unit 310 is connected to the disabling controller 304. The predetermined electrical identification code corresponds with serrations on the ignition key 306.

The transponder 308 using the fixed identification code is employed to provide communication between the disabling controller 304 and the coil unit 310. The transponder 308 operates by way of electromagnetic coupling when the coil unit 310 is in a conducting state.

The communication protocol between the disabling controller 304 and the coil unit 310 are as follows:

Communication system: intermittent drive type;
Modulation system: FSK;
Frequencies in service: 134 KHz (drive), 134 KHz (0), 123 KHz (1);
Communication code: NRZ (read only);
Data length: 64 bits:
Data transfer time: 90 mSEC;

The engine controller 302 and the disabling controller 304 are connected together by way of a master-slave system. In this communication protocol, a fault-diagnosing tool 312 is switchably coupled and decoupled from the disabling controller 304 and engine controller 302.

The master-slave system is also used in star-type local area networks (LANs), and is also referred to as a polling system. In the master-slave system, a master sequentially inquires of each node, which is connected to the master, as to whether communication across the network is desired. The node returns a reply to the inquiry from the master. When the node responds in the affirmative, the node transmits such an affirmative reply followed by communication data. As a result, control within a closed system is provided.

As illustrated in FIG. 8, when the fault-diagnosing tool 312 is switchably coupled into the system, a contact portion 314a of a relay 314 is interposed between the fault-diagnosing tool 312 and the ignition (not shown), while a coil portion 314b of the relay 314 is connected to the disabling controller 304. In addition, a communication circuit interconnects the fault-diagnosing tool 312 and the engine controller 302.

The most recently used rolling authorization codes, when there occurs a correspondence or coincidence in rolling authorization codes from the engine controller 302 and the disabling controller 304, are respectively stored as previously matched codes A1 and B1. The disabling controller 304 is provided with a circuit whereby, when there occurs a mismatch in the rolling authorization codes between the disabling controller 304 and the engine controller 302, a determination is made as to whether or not the rolling authorization codes match the previously matched codes A1 and B1.

In particular, as shown in FIG. 9, the engine controller 302 includes a storage device MEM1 such as an EEPROM for storing both a previously matched rolling code A1 and a present rolling code A2. The disabling controller 304 includes a storage device MEM2 for storing both a previously matched rolling code B1 and a present rolling code B2. In the storage devices MEM1 and MEM2, either a pair of previously matched codes A1, B1, or a pair of present rolling codes A2, B2 always remains stored in a matched state. Consequently, even if one pair of codes are corrupted, the other pair of codes remains intact. As a result, the system can be prevented from failing.

In addition, when the present rolling authorization codes from the disabling controller 304 and the engine controller 302 do not match, the disabling controller 304 determines whether or not previously matched codes A1, B1 match. As a result, the synchronization of the rolling authorization codes is recovered, thereby avoiding an unnecessary shut down of the engine. That is, this is intended to prevent a failure of communication between the disabling controller 304 and the engine controller 302 (determination of a code mismatch) when the values in the storage devices MEM1 and MEM2 are lost and the present rolling authorization codes do not match at the time of the last communication.

Moreover, the disabling controller 304 includes a flag for determining whether or not communication between the disabling controller 304 and the engine controller 302 was interrupted during the last communication. Further, means are provided to prevent resending the rolling authorization codes to the engine controller 302 after the communication between the disabling controller 304 and the engine controller 302 is re-established during the particular communication session that was interrupted.

The rolling-prohibiting conditions cause the flag to be set to 1 when the communication between the controllers 302, 304 is interrupted during the last communication session, or rather when the communication therebetween is interrupted by way of a forced reset due to a drop in the battery voltage. When the flag is set to 1, no resending of the rolling authorization codes occurs.

The flag is reset when the next rolling authorization codes are stored, and when the previous communication between the disabling controller 304 and the engine controller 302 is either brought to a normal end or brought to a forced end by power being turned off during the course of a communication session therebetween. When the flag is set to 1, it indicates that the previous communication between the disabling controller 304 and the engine controller 302 was forcibly interrupted. In this case, there is a possibility that the communication therebetween was discontinued while the rolling authorization codes were being written to the respective storage devices MEM1 and MEM2 of the engine controller 302 and the disabling controller 304. Thus, there is a likelihood that the storage devices MEM1 and MEM2 do not have valid rolling authorization code values stored therein.

The operation of the present invention will be described with reference to FIG. 7. The control routine starts at step 320, and a flag is set equal to 1 in step 322. To be specific, since initialization is effected when the program starts, the flag is usually cleared to a value of zero (0). Thus, the flag is set to 1.

After the flag is set to 1 in step 322, a determination is made at step 324 as to whether or not the present rolling authorization code matches a predetermined rolling authorization code stored in the engine controller 302. When the result of step 324 is YES, the previous matched authorization codes are updated at step 326. When the result of step 324 is NO, the routine advances to step 328 where a determination is made as to whether or not the previously matched rolling authorization codes match in the engine controller 302 and the disabling controller 304.

When the result of step 328 is NO, the routine advances to step 330 where the routine ends abnormally, thereby stopping the internal combustion engine. When the result of step 328 is YES, the routine advances to step 334 where the rolling authorization codes are updated. Updating of the rolling authorization codes will be described hereinafter.

After the previously matched codes are updated at step 326, a determination is made at step 332 as to whether or not the flag is set to 1. When result of step 332 is NO, the rolling authorization codes are updated at step 334. The routine then advances to step 336 where the flag is reset to zero (0). When the result of step 332 is YES, the routine advances to step 336 where the flag is reset to zero (0) without updating the rolling authorization codes in step 334.

The flag in step 336 is reset when the next rolling authorization codes are normally stored. However, the flag remains set to 1 when a controller reset is the result of a drop in the battery voltage during the process of storing the authorization codes in the controllers 302, 304. After the flag is reset in step 336, the control routine ends normally at step 338, and the engine continues normal operation.

When there occurs a mismatch in the rolling authorization codes from the disabling controller 304 and the engine controller 302, the disabling controller 304 determines whether or not the previously matched codes A1 and B1 match. This enables the synchronization of the rolling authorization codes to be recovered when the rolling authorization codes are not synchronized due to the communication between the disabling controller 304 and engine controller 302 being interrupted. As a result, improved convenience of use is provided.

In addition, only a change in the control program is required. As a result, there is no likelihood of a complicated structure, and a reduction in cost can be retained. Furthermore, the disabling controller 304 includes a flag for determining whether or not the communication between the disabling controller 304 and engine controller 302 is interrupted during the last communication session. In addition, means are provided to prevent resending the rolling authorization codes if communication between the disabling controller 304 and engine controller 302 was interrupted during the communication session. As a result, when the power is switched off during the course of a communication session between the disabling controller 304 and engine controller 302 while the rolling authorization codes are being written to the storage devices MEM1 and MEM2, the rolling authorization codes are prevented from being resent to the engine controller 302, whereby the data stored in the storage devices MEM1 and MEM2 can be prevented from being corrupted. Since only a change in the control program is required, there is no likelihood of a complicated structure, and a reduction in cost can be retained.

In sum, the vehicle theft-prevention device according to the present embodiment includes a disabling controller for outputting a predetermined rolling authorization code in response to the predetermined identification code entered from a transponder, but only when the predetermined code from the transponder is correct, and an engine controller for executing control in response to the predetermined rolling authorization code entered from the disabling controller such that the engine may be started when the predetermined rolling authorization code is correct, and the engine is prevented from starting when the predetermined rolling authorization code is incorrect or when no rolling authorization code is transmitted within a predetermined period of time. The present codes, when there occurs a coincidence in the rolling authorization codes from the disabling controller 304 and the engine controller 302, are stored as previously matched codes. The disabling controller 304 is provided with means whereby, when there occurs a mismatch in the rolling authorization codes between disabling controller 304 and the engine controller 302, determination is made as to whether or not the previously-matched rolling authorization codes match. This permits synchronization of the rolling authorization codes to be recovered when the rolling authorization codes do not match due to an interruption of a communication session between the disabling controller 304 and the engine controller 302.

Furthermore, the disabling controller 304 includes a flag for determining whether or not the communication between the disabling controller 304 and the engine controller 302 was interrupted during the last communication session. In addition, means are provided to prevent resending the rolling authorization codes if the communication between the disabling controller 304 and the engine controller 302 was interrupted during the last communication session. As a result, when the power is switched off in the course of a communication session while the authorization codes are being written to the storage devices, the rolling authorization codes are prevented from being resent to the engine controller 302, whereby the data stored in the storage devices MEM1 and MEM2 can be prevented from being corrupted.

Figure 10:
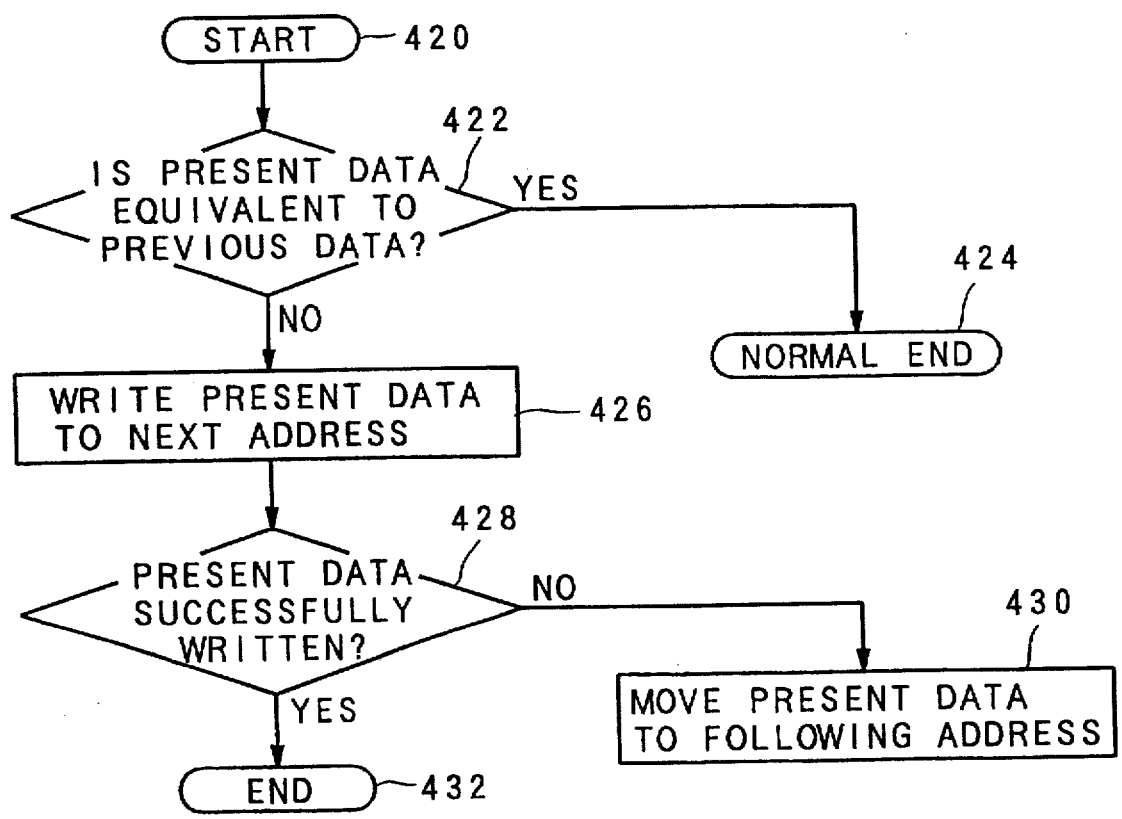
FIG. 10 is a flow chart showing a control routine for a vehicle theft-prevention device according to a third embodiment of the present invention.
Figure 11:
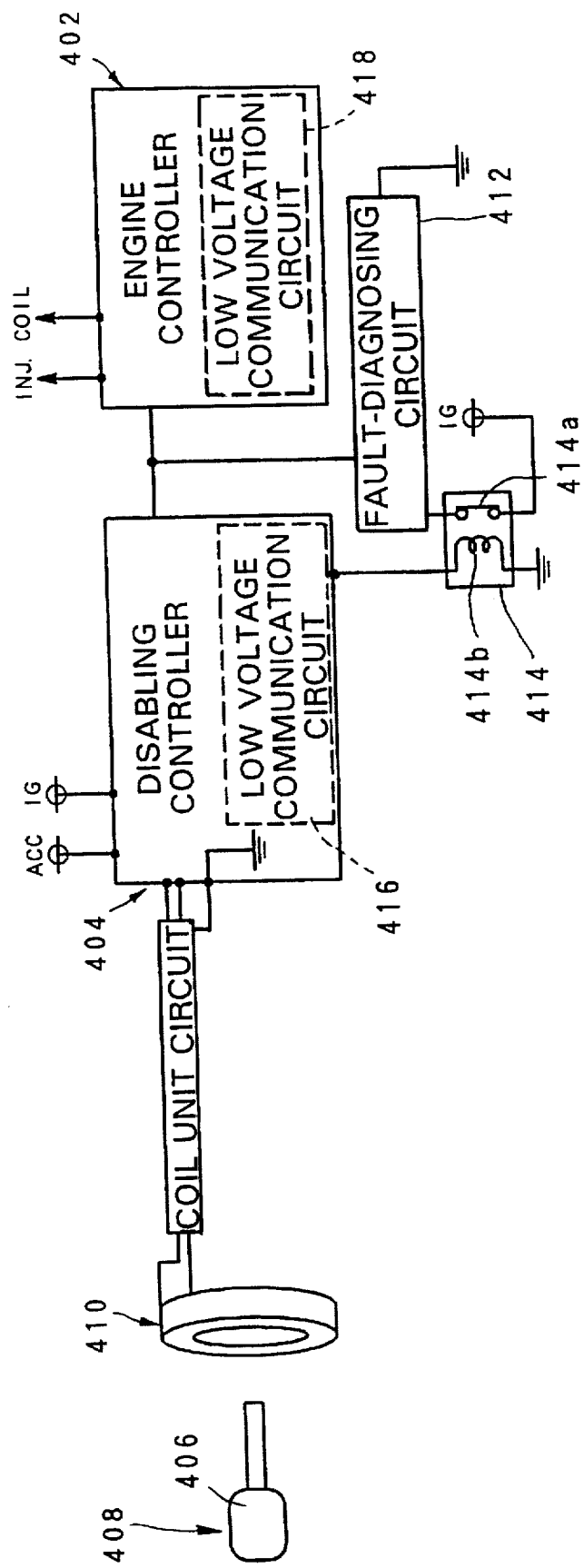
FIG. 11 is a circuit diagram of the vehicle theft-prevention device according to the third embodiment of the present invention.
Figure 12:
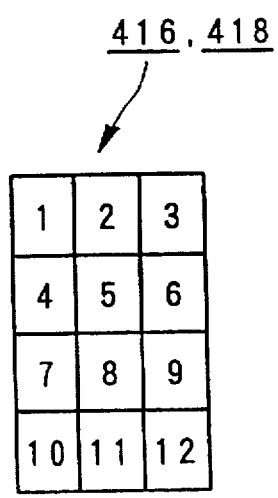
FIG. 12 is a block diagram of a storage device for a disabling controller and an engine controller shown in FIG. 11.
Figure 13:
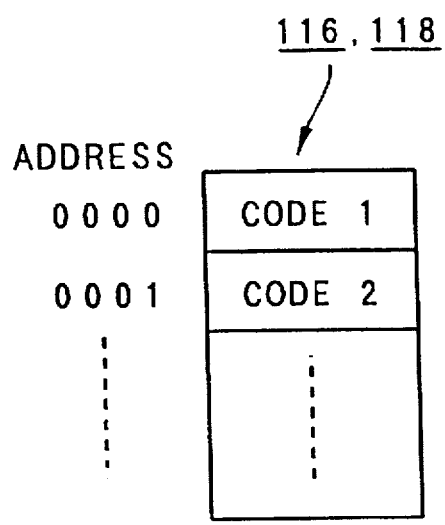
FIG. 13 is a block diagram showing a first storage device for a disabling controller and an engine controller according to the prior art.
Figure 14:
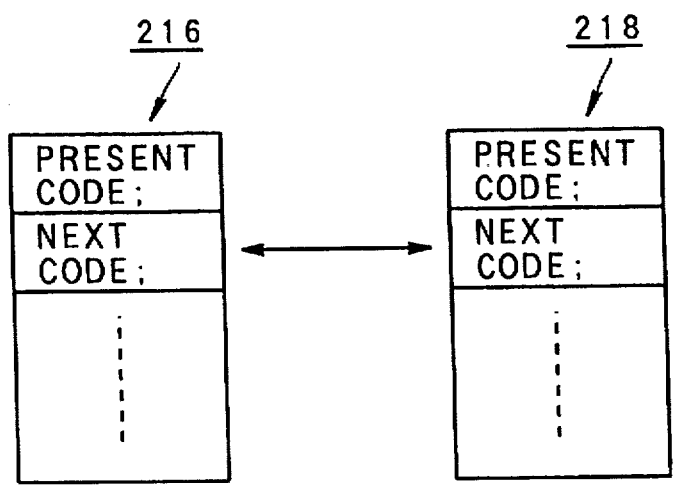
FIG. 14 is a block diagram showing second storage devices for a disabling controller and an engine controller according to the prior art.

FIGS. 10–12 illustrate a vehicle theft-prevention device according to a third aspect of the present invention. In FIG. 11, reference numeral 402 denotes an engine controller for an internal combustion engine (not shown) that is disposed in a vehicle (not shown). Reference numeral 404 denotes a disabling controller which is connected to the engine controller 402. The engine controller 402 is connected to a fuel injector (not shown) and an ignition coil (not shown).

A predetermined rolling authorization code from the disabling controller 404 is entered into the engine controller 402. The engine controller 402 executes control such that a starting operation of the engine continues when the predetermined rolling authorization code is correct, and the starting operation of the engine is stopped when the predetermined rolling authorization code is incorrect, or when no rolling authorization code is transmitted within a predetermined period of time.

Thus, the engine controller 402 permits engine starting to continue by ignition and fuel injection action only when receiving the correct rolling authorization code from the disabling controller 404. Conversely, when the predetermined rolling authorization code is incorrect, or when no rolling authorization code is transmitted within a predetermined period of time, ignition and fuel supply are cut off. A signal lamp (not shown) may then illuminated to signal the presence of an abnormality.

In addition, the vehicle theft-prevention device includes a transponder 408 within an ignition key 406 for outputting a predetermined electrical identification code when electric power is supplied to the transponder 408 when an ignition system is activated by rotating the key 406 into a starting position. The predetermined electrical identification code corresponds to serrations on the key 406. The vehicle theft-prevention device also includes a coil unit 410 in which the key 406 is inserted. The coil unit 410 is connected to the disabling controller 404.

The transponder 408 provides communication between the disabling controller 404 and the coil unit 410. The transponder 408 starts operation by way of an electromagnetic coupling when the coil unit 410 is in a conducting state. The disabling controller 404 and the coil unit 410 communicate in accordance with the same protocol as set forth above (see page 24) with regard to the second embodiment of the present invention. Thus, the engine controller 402 and the disabling controller 404 are connected together by way of a master-slave system. In this communication protocol, a fault-diagnosing tool 412 is switchably coupled and decoupled from the disabling controller 404 and engine controller 402.

As illustrated in FIG. 11, when the fault-diagnosing tool 412 is switchably coupled into the system, a contact portion 414a of a relay 414 is interposed between the fault-diagnosing tool 412 and the ignition (not shown), while a coil portion 414b of the relay 414 is connected to the disabling controller 404. In addition, a communication circuit from the disabling controller 404 interconnects the fault-diagnosing tool 412 and the engine controller 402.

The disabling controller 404 includes a first storage device 416 such as an EEPROM for storing a rolling authorization code. The engine controller 402 includes a second storage device 418 such as an EEPROM for the same purpose. The engine controller 402 executes control such that whenever the rolling authorization codes are stored in the first and second storage devices 416 and 418, an address at which the rolling authorization code is stored, is shifted in order to extend the number of times that the rolling authorization codes can be written to the storage devices 416, 418.

More specifically, as illustrated in FIG. 12, the first storage device 416 and the second storage device 418 are divided into twelve addresses numbered from 1 to 12. Each time a rolling code is communicated, the address to be used is consecutively shifted from address 1 to address 2, etc.

The engine controller 402 is provided with a further function to check the results of writing the rolling authorization codes to the first and second storage devices 416 and 418, and to then execute control such that the codes are moved and written to the next address when the rolling authorization codes cannot be written to the present address. More specifically, if the writing of the codes to the first and second storage devices 416 and 418 is terminated without the codes being normally written thereto, then no codes are written to any address where the codes cannot be written. Instead, the codes are moved and written to the next address.

The engine controller 402 is provided with yet another function to execute control such that when the same rolling authorization codes have already been stored in addresses for storing the rolling authorization codes in the first and second storage device 416 and 418, then the stored rolling authorization codes are used without the codes being written to these addresses. To be specific, if present communication data to be written is identical to the previous communication data that has already been stored in the first and second storage devices 416 and 418, such new communication data is not written. Instead, the previous communication data already stored therein is used as the latest data.

The operation of the present invention will now be described with reference to FIG. 10 which sets forth a control routine for the vehicle theft-prevention device according to the third embodiment of the present invention. The routine begins by writing communication data such as the rolling authorization codes to the first and second storage devices 416 and 418 in step 420. A determination is made in step 422 as to whether or not the communication data is identical to communication data previously stored in the storage devices 416, 418. When the result of step 422 is YES, the routine ends at step 424 without writing the present communication data to the storage devices 416, 418. When the result of step 422 is NO, the communication data is written to the next address as new communication data in step 426.

The routine then advances to step 428 to determine whether or not the data has successfully been written to the next address before processing ends. The determination in step 428 specifically involves reading out the written communication data after the same data has been written, and then comparing the written communication data with additional communication data transmitted at the end of the particular communication session. When the result of step 428 is NO, a determination is made that the present data cannot be written to the next address. The communication data is then written to the following address at step 430. When the result of step 428 is YES, the routine ends at step 432.

Thus, the engine controller 402 is provided with a function to execute control such that whenever the rolling authorization codes are stored in the first and second storage devices 416 and 418, an address at which the rolling authorization code is stored is shifted in order to extend the number of times that the rolling authorization codes can be written. This function enables extension of the number of times that the rolling authorization codes can be written to the address. As a result, the number of times that the rolling authorization codes can be written in the storage devices 416 and 418 can be increased. The number of times that the rolling authorization codes can be written to the storage sections is equal to the number of write operations per byte times the number of bytes. To this end, only a change in the control program is required in the engine controller 402. As a result, the likelihood of a complicated construction is eliminated, and a reduction in cost can be retained.

The engine controller 402 is provided with a further function to check the results of writing the codes to the first and second storage devices 416 and 418, and then to execute control such that the codes are not written to an unavailable address, but are moved to the next address. This function prevents the use of an address where the code cannot be written. Thus, improved convenience of use is provided. Further, to this end, only a change in the control program is required in the engine controller 402. As a result, the possibility of a complicated construction is eliminated, and a reduction in cost can be retained.

The engine controller 402 is provided with another function to execute control such that when the same rolling authorization codes have already been stored in addresses for storing rolling authorization codes in the first and second storage devices 416 and 418, then the stored rolling authorization codes are used without the present codes being written to the addresses. This function contributes to extending the number of times that the codes can be written in the storage devices 416 and 418 because, when the same rolling authorization codes have already been stored in addresses, the stored rolling authorization codes are used without the present codes being written to such addresses. Further, only a change in the control program is required in the engine controller 402. As a result, the likelihood of a complicated construction is eliminated, and a reduction in cost can be retained.

Although the structure of the first and second storage devices has been described as being divided into twelve addresses numbered from 1 to 12, the first and second storage devices may be divided into a plurality of partitions other than twelve, whereby these partitioned addresses are usable.

In sum, the disabling controller 404 and the engine controller 402 include first and second storage devices, respectively, for storing rolling authorization codes. The engine controller 402 is provided with a function so as to execute control such that whenever the rolling authorization codes are stored in the first and second storage devices, an address at which the rolling authorization code is stored is shifted in order to extend the number of times that the code can be written.

This function extends the number of times that codes can be written to the storage devices.

The engine controller 402 is provided with a further function to check the results of writing the codes to the first and second storage sections, and then to execute control such that the codes are not written to an unavailable or impermissible address, but are moved to the next address. This function prevents the use of any address where the code cannot be written.

The engine controller 402 is provided with a further function to execute control such that when the same rolling authorization codes have already been stored in addresses for storing the rolling authorization codes in the first and second storage devices, then the stored rolling authorization codes are used without the present codes being written to these addresses. This function contributes to an extension of the number of times that the codes can be written to the storage devices because when the same rolling authorization codes have already been stored in the addresses, the stored rolling authorization codes are used without the present codes being written to such addresses.

Figure 15:
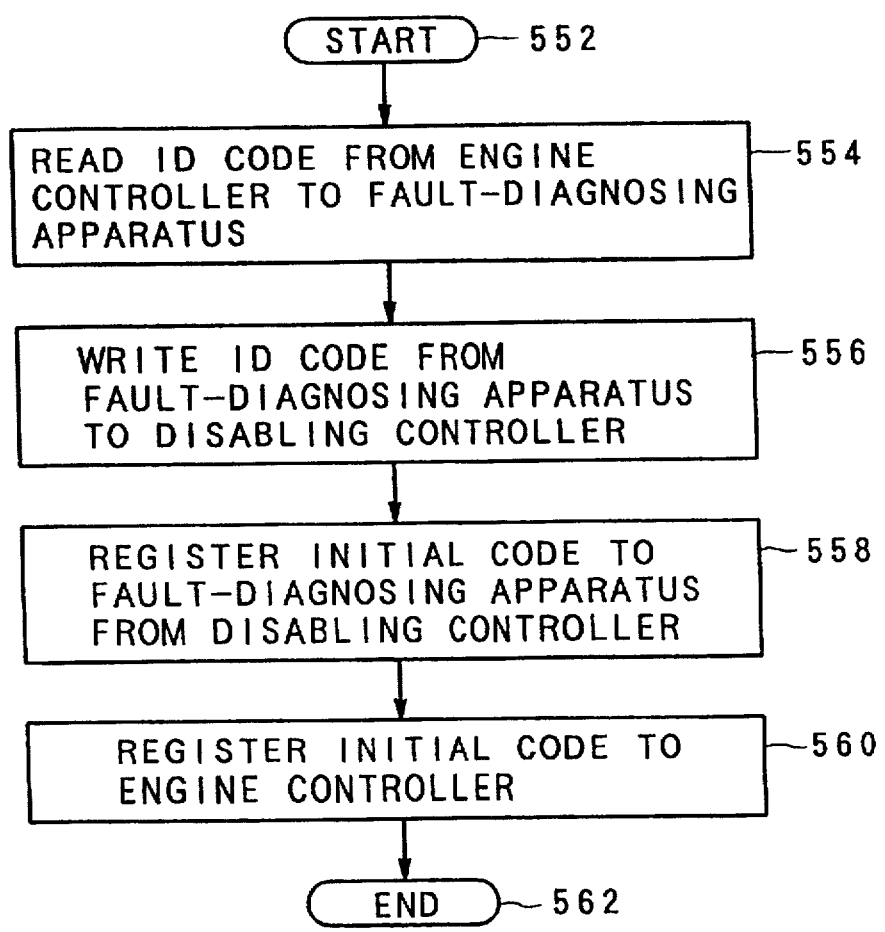
FIG. 15 is a flow chart showing a control routine for a vehicle theft-prevention device according to a fourth embodiment of the present invention.
Figure 16:
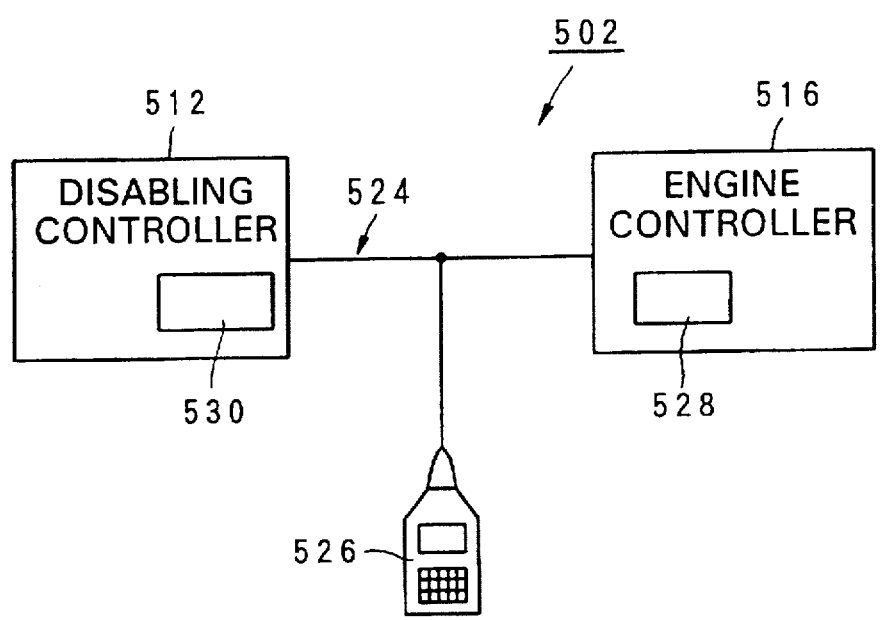
FIG. 16 is a simplified block diagram for the vehicle theft-prevention device according to the fourth embodiment of the present invention.
Figure 17:
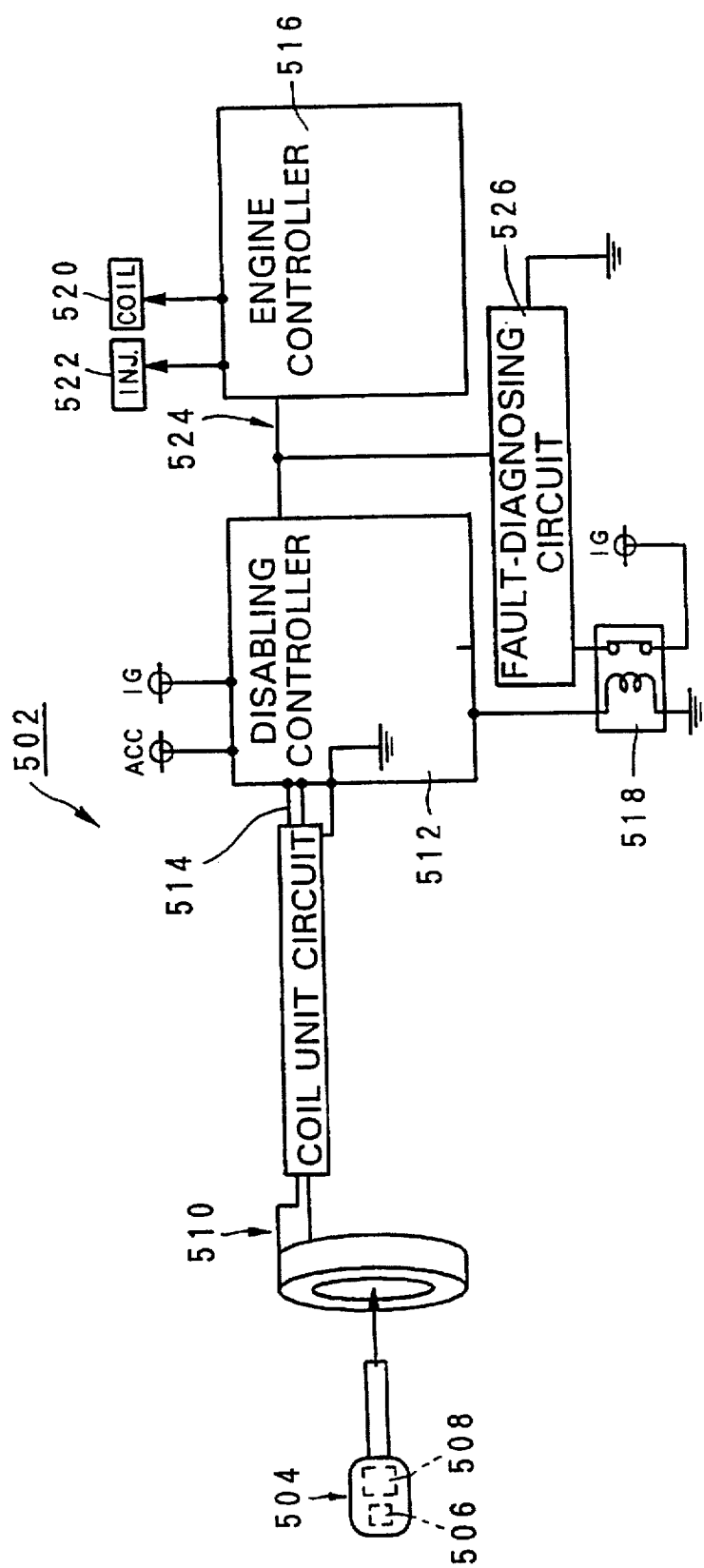
FIG. 17 is a circuit diagram of the vehicle theft-prevention device according to the third embodiment of the present invention.

FIGS. 15–17 illustrate a vehicle theft-prevention device according to a fourth aspect of the present invention. In FIGS. 16 and 17, reference numeral 502 denotes a theft-prevention device for use in a vehicle (not shown), while reference numeral 504 denotes an engine key. The engine key 504 has a predetermined information or identification code stored in an identification code-setting section 506 thereof. The engine key 504 further has an identification code-outputting section or transponder 508 mounted therein. The transponder 508 receives power supplied by an ignition (IG) being switched on, and then outputs the identification code stored in the identification code-setting section 506.

The engine key 504 is inserted into a key groove (not shown), and is thereby connected to a disabling controller 512 through a coil unit 510 by means of a fixed code 514. The transponder 508 initiates operation by way of electro-magnetic coupling when the coil unit 510 is in a conducting state. The identification code from the transponder 508 is input into the disabling controller 512. Only when the identification code is valid, the disabling controller 512 outputs the foregoing identification code to an engine controller 516 when the ignition is switched on. The disabling controller 512 is connected to a relay 518.

The engine controller 516 is connected to an ignition system 520 and a fuel injection system 522. Accordingly, only when receiving a valid identification code from the disabling controller 512, the engine controller 516 operates the ignition system 520 and the fuel injection system 522 so as to start the engine. When an invalid identification code is entered into the engine controller 516, or when no identification code is fed thereto within a few seconds immediately after the ignition is switched on, the engine controller 516 brings the ignition system 520 or the fuel injection system 522 out of operation or into different state in order to disable engine start-up.

The disabling controller 512 and the engine controller 516 are linked together via a communication line 524. A fault-diagnosing apparatus or tool 526 is connected to the communication line 524. The apparatus 526 is used for replacement of the identification code-setting section 506, the disabling controller 512, and the engine controller 516. The fault-diagnosing apparatus 526 is connected to the relay 518 as well.

As illustrated in FIG. 16, the disabling controller 512 is provided with an ID code-storing section 530. The storage section 530 stores an engine controller ID code of an ID code-setting section 528 of the engine controller 516 through the fault-diagnosing apparatus 526 when the vehicle theft-prevention device 502 is assembled into a vehicle.

The operation of the present invention will now be described with reference to FIG. 10 which sets forth a control routine for the vehicle theft-prevention device according to the fourth aspect of the present invention. The routine in the disabling controller 512 starts at step 552. Initially, a predetermined engine controller ID code is read into the fault-diagnosing apparatus 526 from the ID code-setting section 528 of the engine controller 516 at step 554. The ID code-storing section 530 of the disabling controller 512 stores the foregoing engine controller ID code through the fault-diagnosing apparatus 526 at step 556.

Thereafter, an initial code is registered to the fault-diagnosing apparatus 526 from the disabling controller 512 at step 558. Further, the initial code is registered to the ID code-setting section 528 of the engine controller 516 from the fault-diagnosing apparatus 526 at step 560. The routine then ends at step 562. As a result, when the vehicle theft-prevention device 502 is assembled into a vehicle, the fault-diagnosing apparatus 526 is coupled to the communication line 524 between the disabling controller 512 and the engine controller 516 so that the ID code of the engine controller 516 can be stored by the disabling controller 512.

The disabling controller 512 identifies the engine controller 516 by the stored ID code, whereby a baud rate is determined. Accordingly, when vehicle theft-prevention devices are mounted on or attached to vehicles in an assembly line, or when vehicle theft-prevention devices to be mounted on vehicles in an assembly line are additionally supplied because of deficiency in quantity, settings of the disabling controller 512 need not be divided according to the communication speeds or baud rates of the engine controller 516. Consequently, numerous versions of the disabling controller 512 need not be provided. Furthermore, since the use of the communication line 524 permits the ID code to be stored by the disabling controller 512, and permits an initial code to be registered in the engine controller 516, there is no need for components such as a changeover switch, which thus leads to a simpler construction at low cost.

In sum, the disabling controller stores an ID code of the engine controller through the fault-diagnosing apparatus when the vehicle theft-prevention device is assembled into a vehicle. The disabling controller identifies the engine controller by the stored ID code, whereby a baud rate is determined. As a result, settings of the disabling controller need not be divided according to the baud rates. In addition, the use of the communication line eliminates the need for components such as a changeover,switch, whereby a simpler construction at low cost is achievable.

Figure 18:
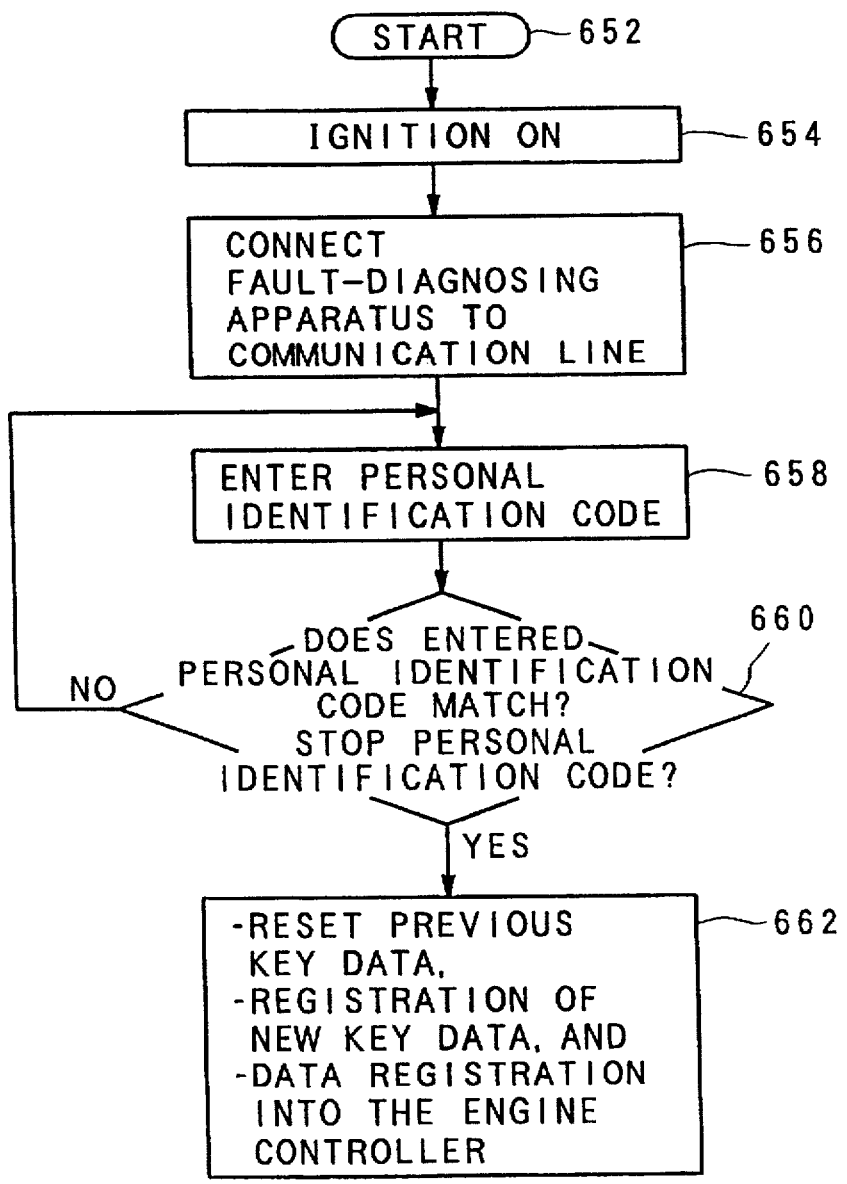
FIG. 18 is a flow chart showing a control routine for a vehicle theft-prevention device according to a fifth embodiment of the present invention.
Figure 19:
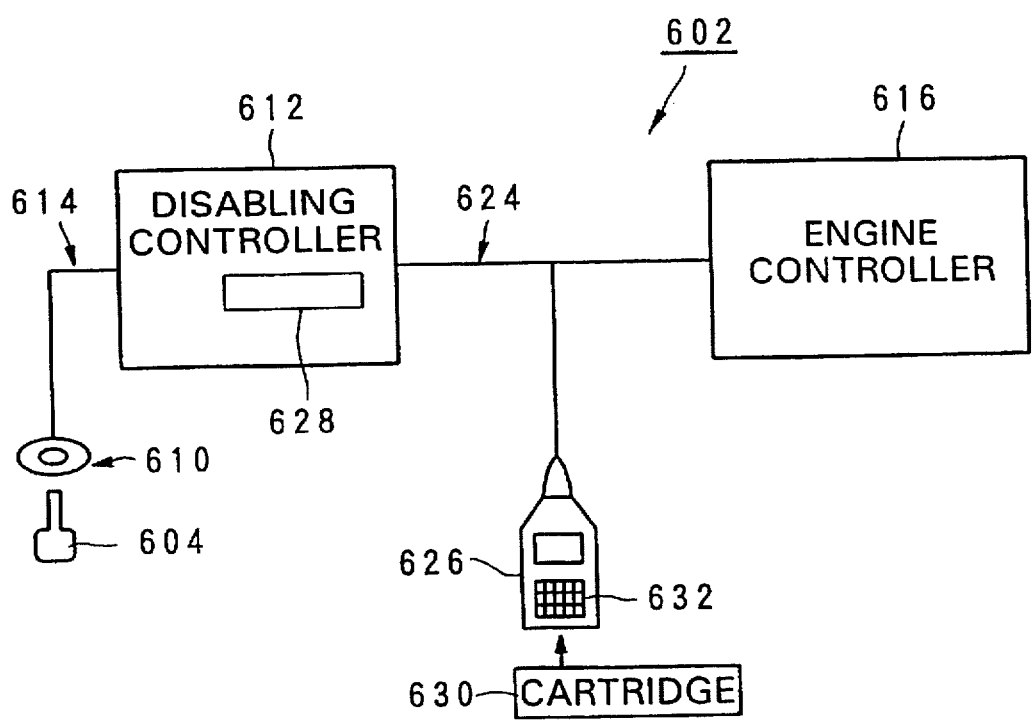
FIG. 19 is a simplified block diagram for the vehicle theft-prevention device according to the fifth embodiment of the present invention.
Figure 20:
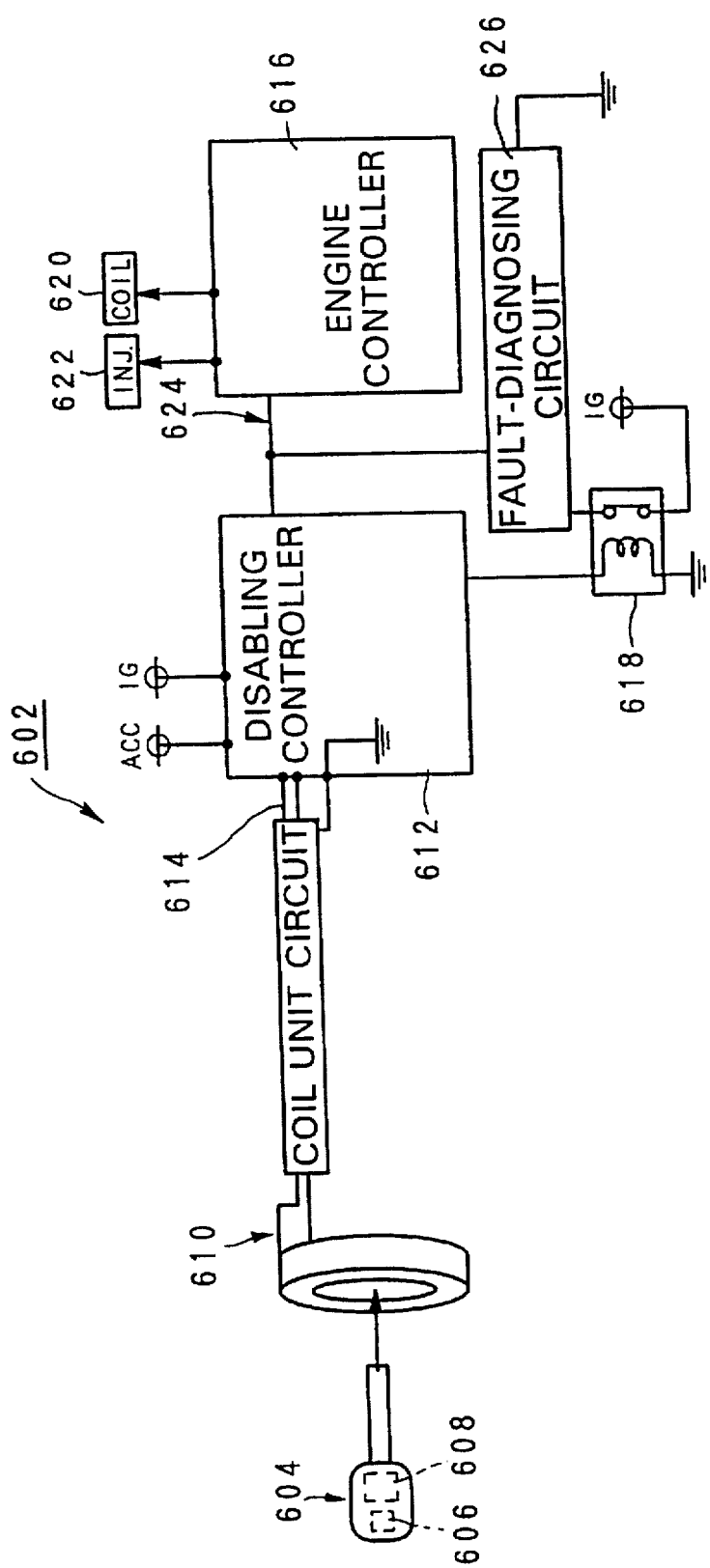
FIG. 20 is a circuit diagram of the vehicle theft-prevention device according to the fifth embodiment of the present invention.

FIGS. 18–20 illustrate a vehicle theft-prevention device according to a fifth aspect of the present invention. In FIGS. 19 and 20, reference numeral 602 denotes a theft-prevention device for use in a vehicle (not shown), while reference numeral 604 denotes an engine key. The engine key 604 has a predetermined information or identification code stored in an identification code-setting section 606 thereof. The engine key 604 further has an identification code-outputting section or transponder 608 mounted therein. The transponder 608 receives power supplied by an ignition (IG) being switched on, and then outputs the identification code stored in the identification code-setting section 606.

The engine key 604 is inserted into a key groove (not shown), and is thereby connected to a disabling controller 612 through a coil unit 610 by means of a fixed code 614. The transponder 608 initiates operation by way of electro-magnetic coupling when the coil unit 610 is in a conducting state. The identification code from the transponder 608 is input into the disabling controller 612. Only when the identification code is valid, the disabling controller 612 outputs the foregoing identification code to an engine controller 616 when the ignition is switched on. The disabling controller 612 is connected to a relay 618.

The engine controller 616 is connected to an ignition system 620 and a fuel injection system 622. Accordingly, only when receiving a valid identification code from the disabling controller 612, the engine controller 616 operates the ignition system 620 and the fuel injection system 622 so as to start the engine. When an invalid identification code is entered into the engine controller 616, or when no identification code is fed thereto within a few seconds immediately after the ignition is switched on, the engine controller 616 brings the ignition system 620 or the fuel injection system 622 out of operation or into different state in order to disable engine start-up.

The disabling controller 612 and the engine controller 616 are linked together via a communication line 624. A fault-diagnosing apparatus or tool 626 is connected to the communication line 624. The apparatus 626 is used for replacement of the identification code-setting section 606, the disabling controller 612, and the engine controller 616. The fault-diagnosing apparatus 626 is connected to the relay 618 as well.

As illustrated in FIG. 19, the disabling controller 612 is provided with a personal identification code-setting section 628 at which a predetermined personal identification code is established. The fault-diagnosing apparatus 626 is provided with a cartridge 630 that is exclusively used by the disabling controller 612. The cartridge 630 can be incorporated into the fault-diagnosing apparatus 626. In addition, the cartridge 630 allows a personal identification code to be entered through the fault-diagnosing apparatus 626. To this end, the fault-diagnosing apparatus 626 is provided with a personal identification code-inputting section 632.

As a result, the disabling controller 612 can be accessed, but only when the predetermined personal identification code stored in the disabling controller 612 matches a personal identification code entered through the fault-diagnosing apparatus 626. Once access to the disabling controller is gained, operations such as resetting the previous key data, registration of new key data, data registration into the engine controller 16 and the like, may be performed.

The operation of the present invention will now be described with reference to FIG. 18 which sets forth a control routine for the vehicle theft-prevention device according to the fifth aspect of the present invention. The routine in the disabling controller 612 starts at step 652, when the ignition is switched on at step 654. At the same time, the engine controller 616 brings the ignition system 620 and the fuel injection system 622 into usual operation. The fault-diagnosing apparatus 626 is connected to a communication line 624 at step 656.

A personal identification code is entered through the personal identification code-inputting section 632 at step 658. Then, a determination is made at step 660 as to whether or not a predetermined personal identification code stored in the personal identification code-setting section 628 is coincident with or otherwise matches the personal identification code entered via the personal identification code-inputting section 632. When the result of step 660 is NO, the routine returns to step 658.

When the result of step 660 is YES, the routine advances to step 662 where access to the disabling controller 612 is gained. Step 612 may involve resetting of the identification code-setting section 606 of the engine key 604, registration of new key data, register data into the engine controller 616, and the like. As a result, tools such as a master key need not be left in the user's custody, thereby easing the burden of maintaining custody of the master key on the user. Thus, low cost is achievable.

In addition, an existing fault-diagnosing apparatus 626 is usable, which enables a reduction in a plant investment in the market. Furthermore, since a personal identification code is fed into the fault-diagnosing apparatus 626, better security is provided. Moreover, further components such as an electric circuit etc. need not be added. Consequently, fewer components and a simpler construction are achievable.

In sum, the vehicle theft-prevention device according to the present invention includes a predetermined personal identification code stored in the disabling controller, and a cartridge capable of being incorporated into the fault-diagnosing apparatus, where the cartridge enables a personal identification code to be entered through the fault-diagnosing apparatus. As a result, only entry of the personal identification code into the fault-diagnosing apparatus is required for registration, thereby eliminating the need for a master key and lightening the burden imposed on the user, with a consequential reduction in cost.

Although a particular preferred embodiments of the invention have been disclosed in detail for illustrative purposes, it will be recognized that variations of modifications of the disclosed invention, including the rearrangement of parts, lie within the scope of the present invention.

The embodiments of the invention in which an exclusive property or privilege is claimed are defined as follows:

1. A vehicle theft-prevention device comprising: an ignition key having a transponder; a coil unit for supplying power to said transponder when said ignition key is inserted into said coil unit and then turned to a starting position thereby permitting said transponder to generate an identification code; said coil unit outputting said identification code to a disabling controller wherein said disabling controller outputs an engine drive signal when said identification code from said coil unit is valid and outputs an engine stop signal when said identification code is invalid; and an engine controller for permitting an engine starting operation to continue when said engine drive signal is input into said engine controller from said disabling controller within a predetermined communication time period from a moment said engine starting operation is initiated by turning said ignition key to said start position; wherein said disabling controller and said engine controller are provided with respective low-voltage communication circuits for communicating therebetween when a battery voltage is less than a predetermined low-voltage level after said engine starting operation is initiated.

2. The vehicle theft-prevention device as defined in claim 1, wherein said low-voltage communication circuit of said disabling controller restarts a communication session with said engine controller when said battery voltage is greater than or equal to a predetermined resumption voltage level after a period of time between said initiation of said engine starting operation and said battery voltage dropping below said predetermined low-voltage level.

3. The vehicle theft-prevention device as defined in claim 1, wherein said low-voltage communication circuit of said engine controller extends said predetermined communication time period when said battery voltage is greater than or equal to a predetermined resumption voltage level after a period of time between said initiation of said engine starting operation and said battery voltage dropping below said predetermined low-voltage level.

4. In a vehicle theft-prevention device including a transponder associated with an ignition key which outputs a predetermined identification code in response to power supplied to the transponder when the ignition key is positioned within a key cylinder and turned to a starting position, in which said predetermined identification code corresponds with key serrations of said key, a disabling controller which outputs a predetermined rolling authorization code in response to a valid identification code received from the transponder, and an engine controller which permits an engine starting operation to continue when the rolling authorization code received from the disabling controller is valid and which prevents an engine from starting when the rolling authorization code is invalid or when no rolling authorization code is received from the disabling controller within a predetermined period of time, wherein the improvement comprises:

> means for storing a present rolling authorization code from the disabling controller as a previous rolling authorization code from the disabling controller and for storing a present rolling authorization code from the engine controller as a previous rolling authorization code from the engine controller when said present rolling authorization code from the disabling controller matches said present rolling authorization code from said engine controller; and
>
> means associated with the disabling controller for determining whether or not said previous rolling authorization code from the disabling controller and said previous rolling authorization code from said engine controller match when said present rolling authorization code from the disabling controller does not match said present rolling authorization code from the engine controller.

5. The vehicle theft-prevention device as defined in claim 4, wherein said disabling controller includes means for determining whether or not a previous communication session between said disabling controller and said engine controller was interrupted; and means for preventing said previous rolling authorization codes from being updated with said present rolling authorization codes when said previous communication session was interrupted.

6. In a vehicle theft-prevention device including a transponder associated with an ignition key which outputs a predetermined identification code in response to power supplied to the transponder when the ignition key is positioned within a key cylinder and turned to a starting position, a disabling controller which outputs a predetermined rolling authorization code in response to a valid identification code received from the transponder, and an engine controller which permits an engine starting operation to continue when the rolling authorization code received from the disabling controller is valid and which prevents an engine from starting when the rolling authorization code is invalid or when no rolling authorization code is received from the disabling controller within a predetermined period of time, wherein the improvement comprises:

> a first storage device associated with the disabling controller for storing a first rolling authorization code;
>
> a second storage device associated with the engine controller for storing a second rolling authorization code; and
>
> means associated with the engine controller for generating a first shifted address within said first storage device and a second shifted address within said second storage device so as to store said first and said second rolling authorization codes at said first and said second shifted addresses, respectively.

7. The vehicle theft-prevention device as defined in claim 6, wherein said engine controller includes means for verifying that said first and said second rolling authorization codes were written to said first and said second storage devices, respectively; and means for writing said first and said second rolling authorization codes to a next address if said verifying means determines that said first and said second rolling authorization codes were not written to said first and said second storage devices.

8. The vehicle theft-prevention device as defined in claim 6, wherein said engine controller includes means for preventing said first and said second rolling authorization codes from being written to said first and said second storage devices when said first and said second rolling authorization codes were previously stored in said first and said second storage devices.

9. In a vehicle theft-prevention device including an engine key having an identification code retained therein and having a transponder for outputting the identification code in response to power being applied to the transponder, a disabling controller for outputting the identification code received from the transponder when the identification code is valid, an engine controller for starting an engine when the identification code is received from the disabling controller, and a fault-diagnosing apparatus coupled to a communication line between the disabling controller and the engine controller, wherein the improvement comprises:

> storage means associated with the disabling controller for storing an ID code associated with the engine controller, the fault-diagnosing apparatus receiving said ID code from the engine controller and sending said ID code to said storage means when the vehicle theft-prevention device is assembled into a vehicle.

10. A vehicle theft-prevention device according to claim 9, wherein said disabling controller identifies said engine controller and determines a baud rate between said disabling controller and said engine controller.

11. A vehicle theft-prevention device according to claim 9, wherein said engine controller has code setting means associated therewith which sets said ID code, said fault-diagnosing apparatus receiving said ID code from said code setting means and sending said ID code to said storage means wherein said storage means stores said ID code.

12. In a vehicle theft-prevention device including an engine key having an identification code retained therein and having a transponder for outputting the identification code in response to power being applied to the transponder, a disabling controller for outputting the identification code received from the transponder when the identification code is valid, an engine controller for starting an engine when the identification code is received from the disabling controller, and a fault-diagnosing apparatus coupled to a communication line between the disabling controller and the engine controller, wherein the improvement comprises:

> means for storing a predetermined personal identification code in the disabling controller; and
>
> a cartridge associated with the fault-diagnosing apparatus which permits said personal identification code to be entered through said fault-diagnosing apparatus.

13. The vehicle theft-prevention device as defined in claim 12, further including means for resetting an identification code associated with the ignition key when said predetermined personal identification code stored in the disabling controller is the same as said personal identification code entered through the fault-diagnosing apparatus.

\* \* \* \* \*